United States Patent
Zhodzicshsky et al.

(10) Patent No.: US 6,463,091 B1
(45) Date of Patent: Oct. 8, 2002

(54) SPREAD SPECTRUM RECEIVER USING A PSEUDO-RANDOM NOISE CODE FOR RANGING APPLICATIONS IN A WAY THAT REDUCES ERRORS WHEN A MULTIPATH SIGNAL IS PRESENT

(75) Inventors: Mark Zhodzicshsky, Moscow (RU); Victor Veitsel, Moscow (RU); Stanislov Sila-Novatisky, Moscow (RU); Javad Ashjaee, Saratoga, CA (US); Lionel Garin, Palo Alto, CA (US)

(73) Assignee: Magellan Corporation, Santa Clara, CA (US)

( * ) Notice: Subject to any disclaimer, the term of this patent is extended or adjusted under 35 U.S.C. 154(b) by 0 days.

(21) Appl. No.: 09/577,023

(22) Filed: May 23, 2000

(Under 37 CFR 1.47)

Related U.S. Application Data

(63) Continuation of application No. 09/290,576, filed on Apr. 13, 1999, now abandoned, which is a continuation of application No. 08/512,822, filed on Aug. 9, 1995, now Pat. No. 5,953,367.

(51) Int. Cl.$^7$ .......................... H04K 1/00; H04L 27/06; H04L 1/02
(52) U.S. Cl. ...................... 375/149; 375/150; 375/343; 375/347
(58) Field of Search .................................. 375/147, 150, 375/148, 149, 347, 267, 343, 326; 455/132; 342/357.12; 701/213–215

(56) References Cited

U.S. PATENT DOCUMENTS

| | | |
|---|---|---|
| 4,754,465 A | 6/1988 | Trimble |
| 4,809,005 A | 2/1989 | Counselman, III .......... 342/352 |

(List continued on next page.)

FOREIGN PATENT DOCUMENTS

| | | |
|---|---|---|
| EP | 0552975 A2 | 7/1993 |
| SU | 1367815 | 9/1997 |
| WO | W9637789 | 11/1996 |

OTHER PUBLICATIONS

Article by: Townsend et al., A Practical Approach to the Reduction of Pseudorange Multipath Errors in a L1 GPS Receiver,: *NovAtel Communications Ltd.*, pp. 143–148.

New Technology Report Prepared by: P.H. Ware, NASA, Technical Support Package assembled by: JPL Technology Utilization Office, pp. I, 1–2, 1a–9a; (Oct. 1994).

Meehan, T.K. "Processing in a GPS Receiver to Reduce Multipath Errors," New Technology Report, Assembled by: JPL Technology Utilization Office, pp. I, 1–2, 1a–9a (Oct. 1994).

*Primary Examiner*—Tesfaldet Bocure
(74) *Attorney, Agent, or Firm*—J. D. Harriman, II, Esq.; Coudert Brothers LLP

(57) ABSTRACT

A receiver of a radio frequency signal having a pseudo-random noise (PRN) code, and techniques of processing such a signal that are especially adapted for ranging applications. A signal corresponding to the PRN code is locally generated and used for decoding the received signal in a manner to reduce ranging errors that can result when multipath (delayed) versions of the radio frequency signal are also present. A significant application of the receiver and signal processing techniques of the present invention is in a Global Positioning System (GPS), wherein a number of such signals from several satellites are simultaneously received and processed in order to obtain information of the position, movement, or the like, of the receiver. A delay locked loop (DLL) correlator, provided in each of the receiver's multiple processing channels, locks onto a line of sight signal from one of the satellites with the effect of any multipath signal(s) being significantly reduced.

4 Claims, 13 Drawing Sheets

U.S. PATENT DOCUMENTS

| | | |
|---|---|---|
| 4,847,862 A | 7/1989 | Braisted et al. |
| 4,928,106 A | 5/1990 | Ashjaee et al. .............. 375/352 |
| 5,101,416 A | 3/1992 | Fenton et al. ................ 375/150 |
| 5,347,536 A | 9/1994 | Meehan ....................... 375/148 |
| 5,390,207 A | 2/1995 | Fenton et al. ................ 375/149 |
| 5,402,441 A | 3/1995 | Washizu et al. |
| 5,402,450 A | 3/1995 | Lennen ....................... 375/343 |
| 5,414,729 A | 5/1995 | Fenton ........................ 375/149 |
| 5,436,935 A | 7/1995 | Bernhard et al. ............ 375/367 |
| 5,493,588 A | 2/1996 | Lennen ....................... 375/343 |
| 5,517,535 A | 5/1996 | Kroeger et al. |
| 5,537,121 A | 7/1996 | Lennen .................. 342/357.12 |
| 5,630,208 A * | 5/1997 | Enge et al. .................... 455/65 |
| 5,734,674 A | 3/1998 | Fenton et al. ................ 375/150 |

* cited by examiner

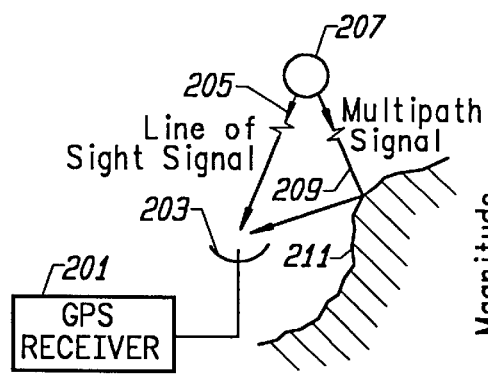
FIG. 1
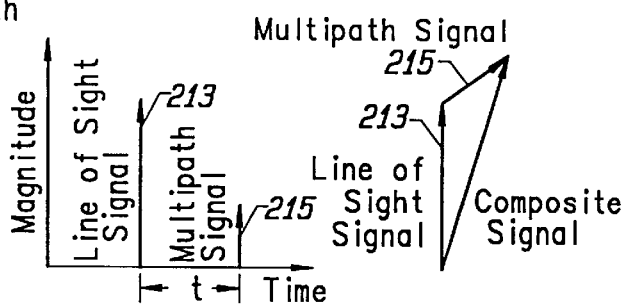
FIG. 2
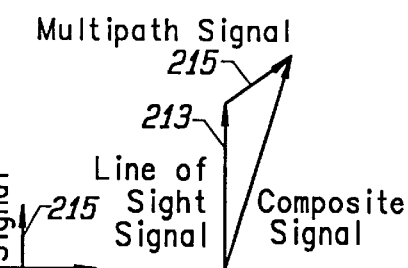
FIG. 3
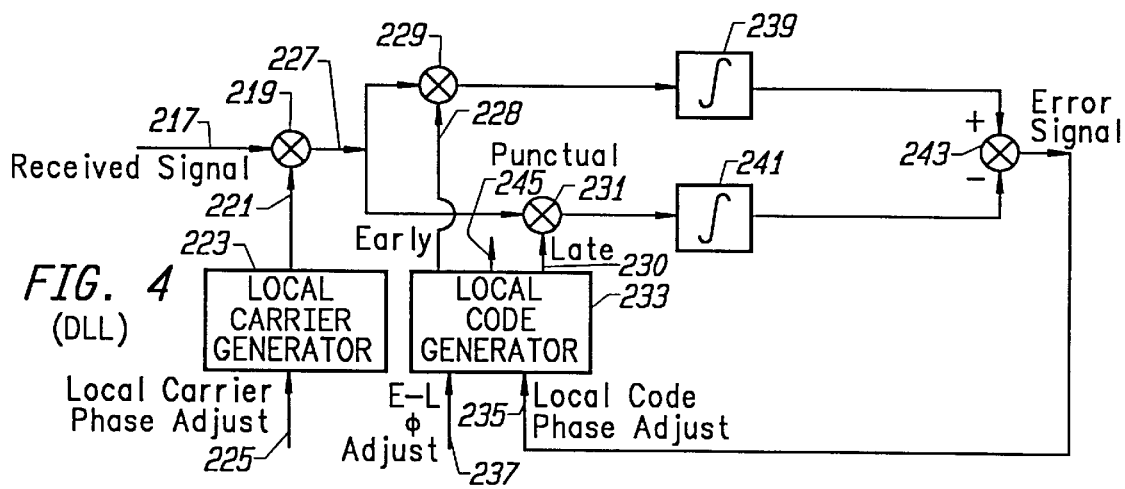
FIG. 4 (DLL)
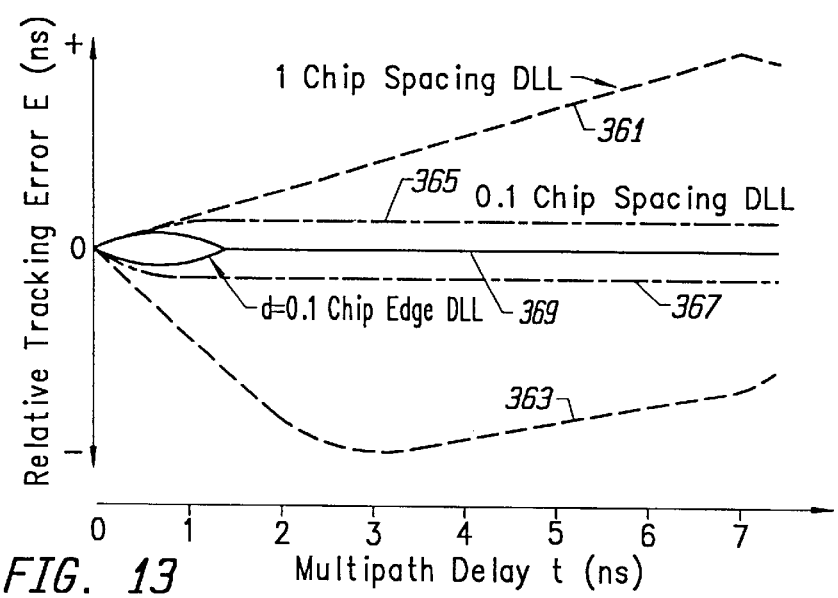
FIG. 13

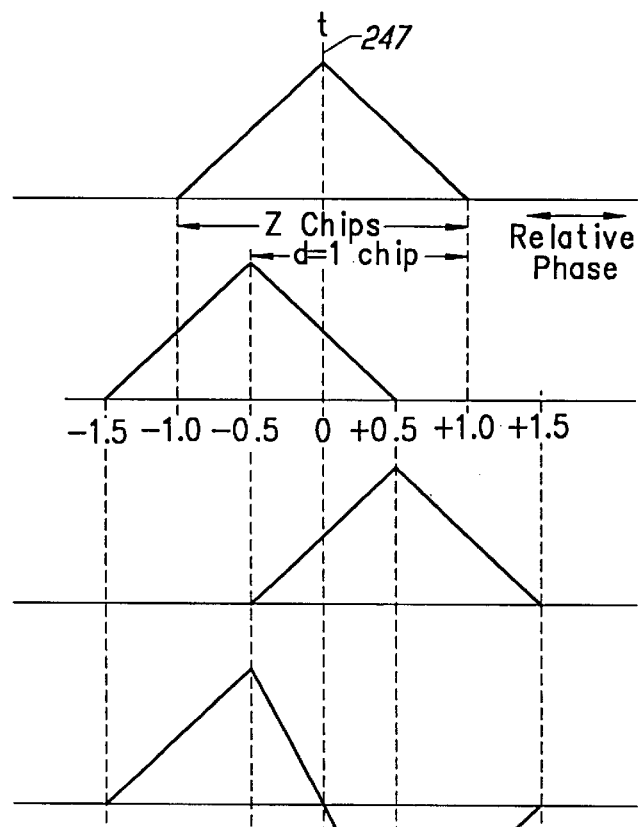
FIG. 5A (Punctual)
FIG. 5B (Early)
FIG. 5C (Late)
FIG. 5D (Error Signal)
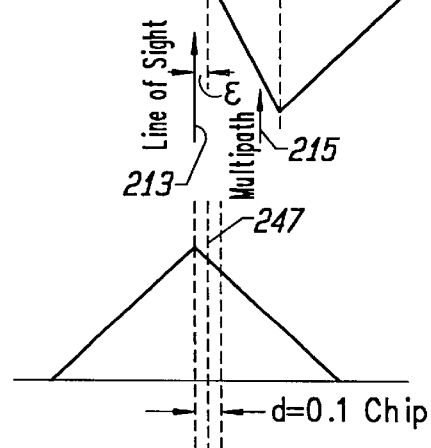
FIG. 6A (Early)
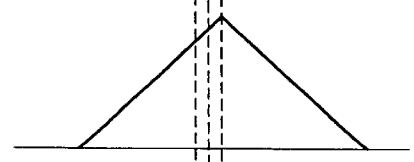
FIG. 6B (Late)
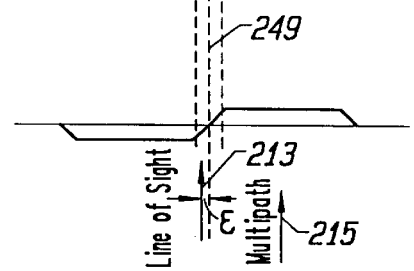
FIG. 6C (Error Signal)

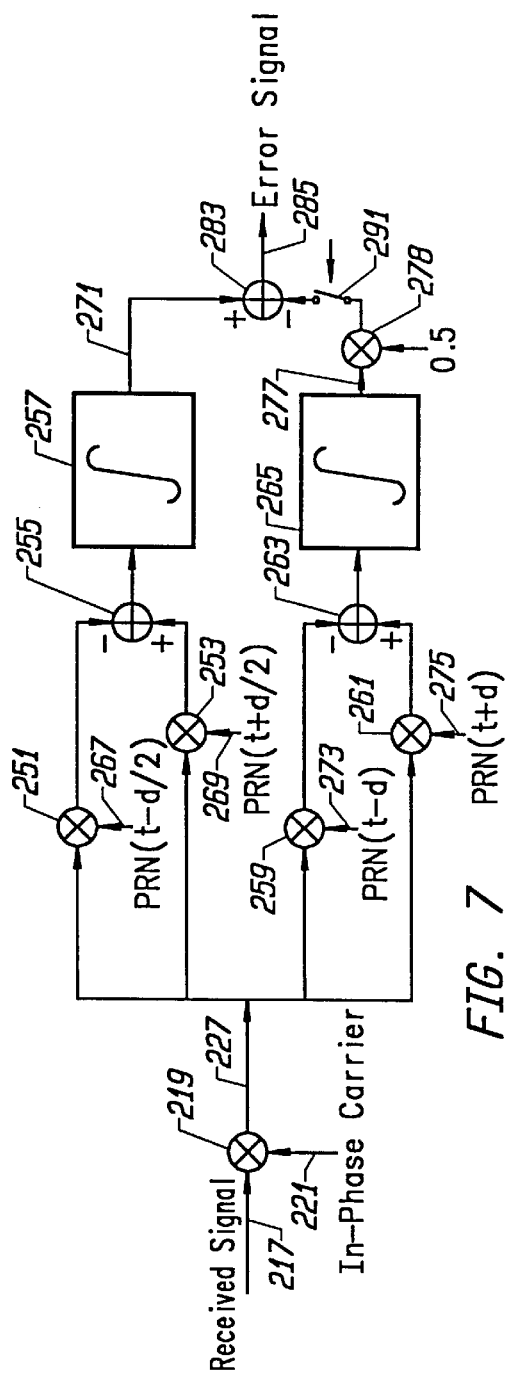
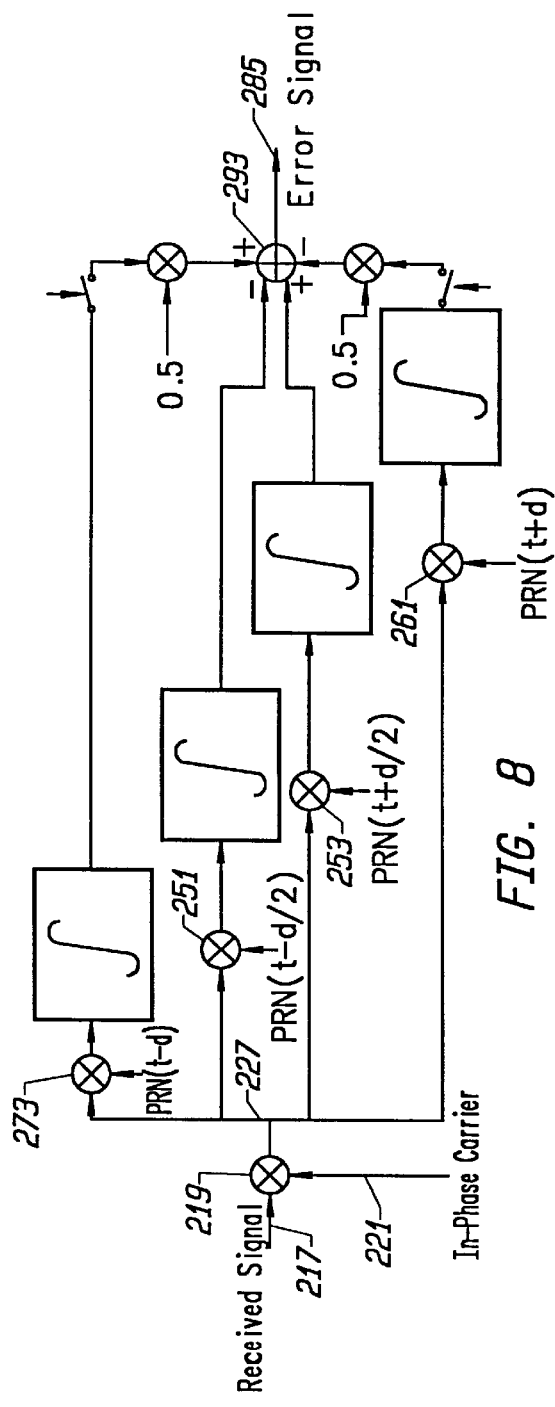
FIG. 7
FIG. 8

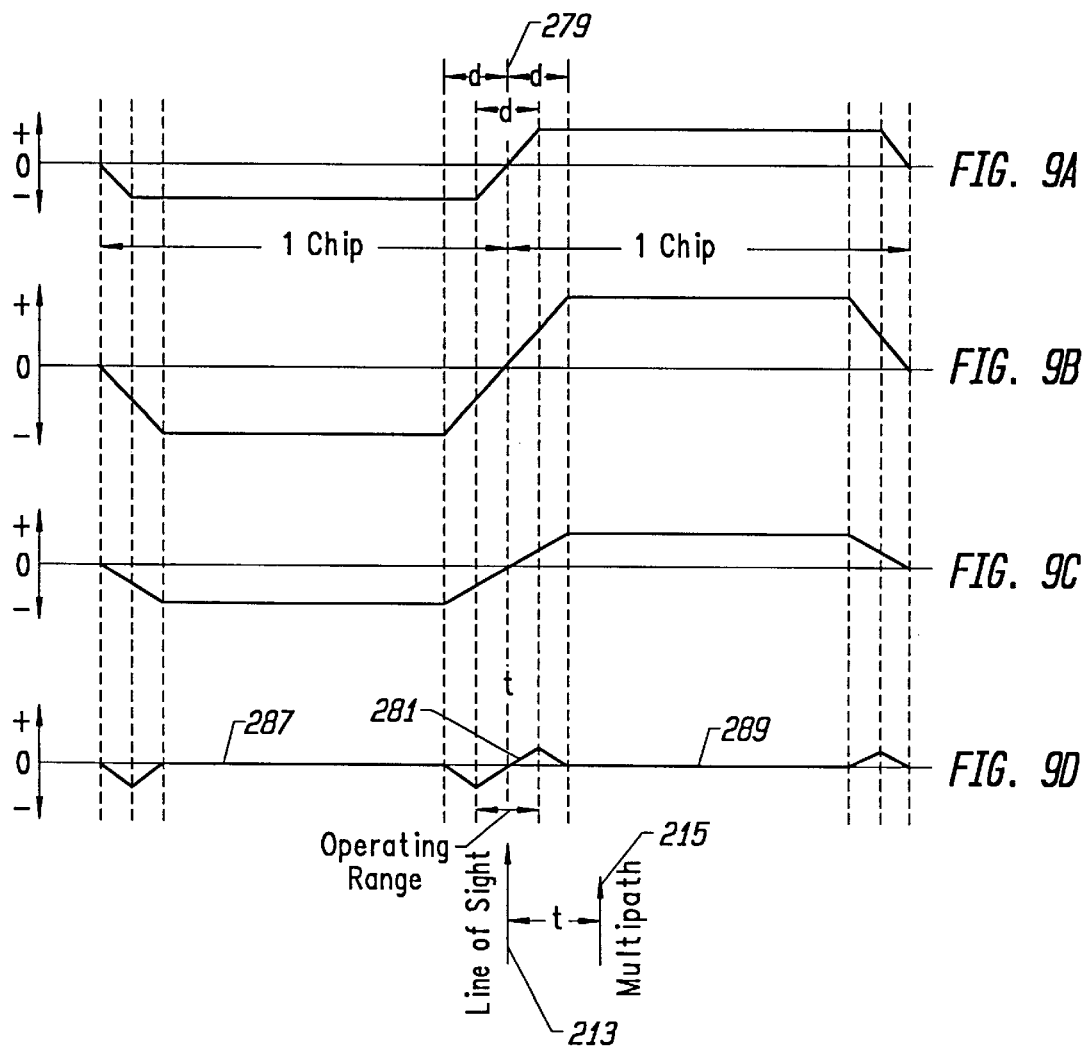
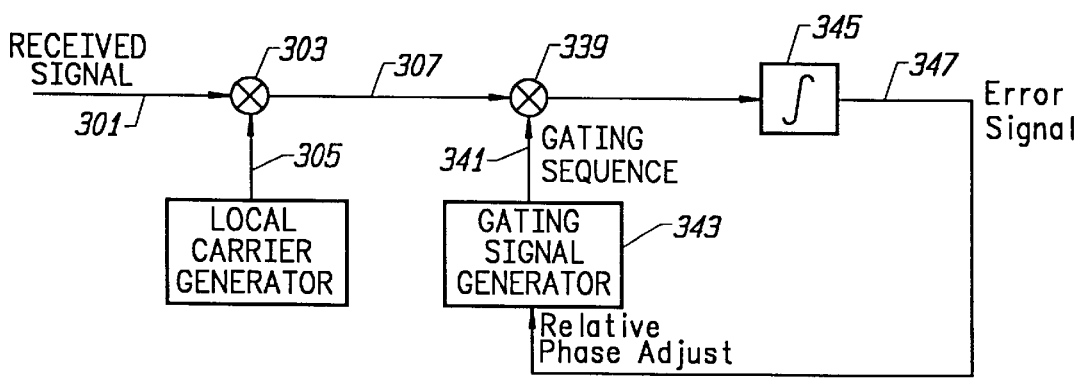
FIG. 10

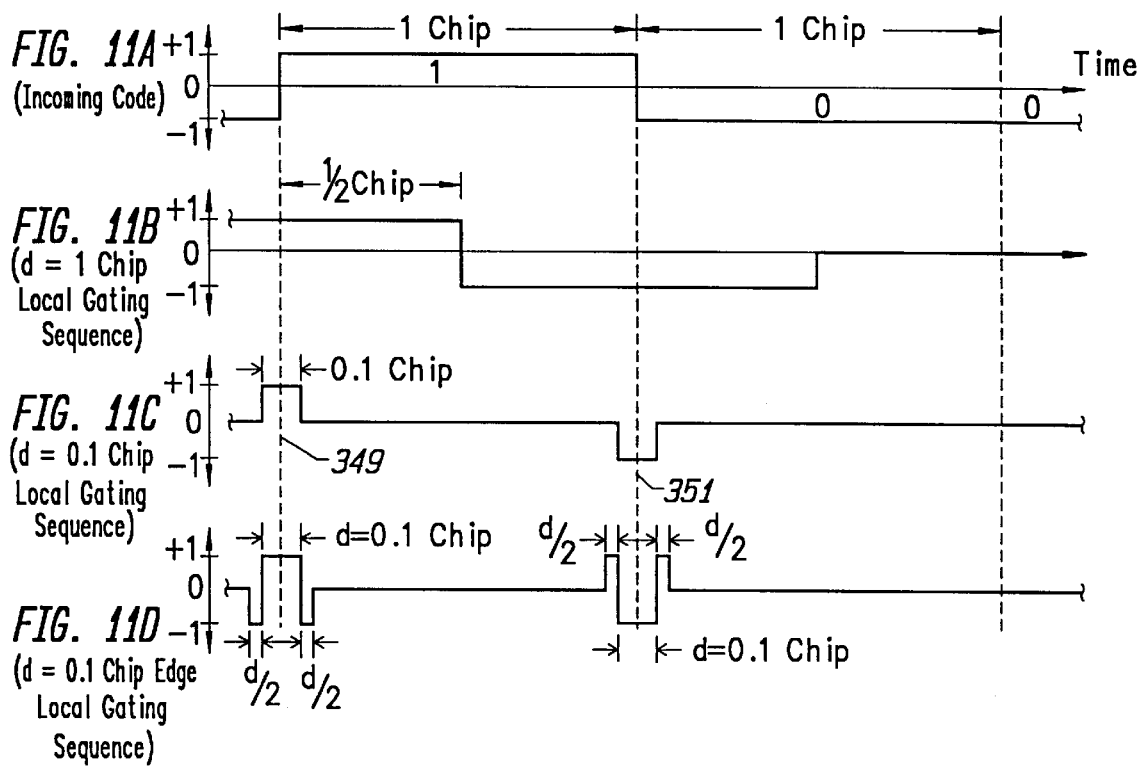
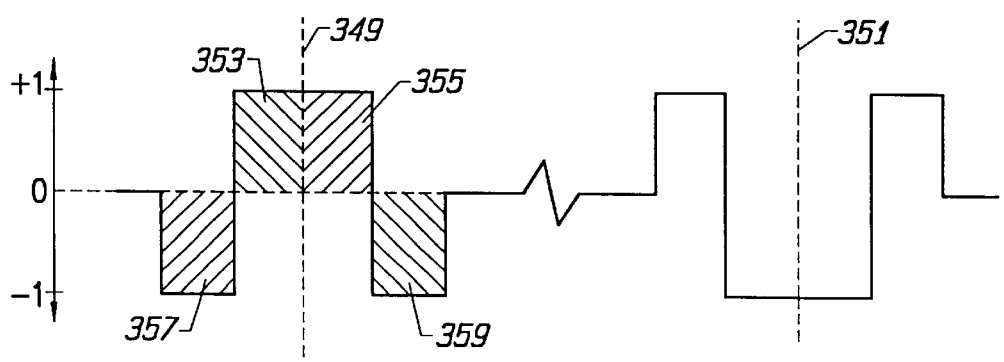
FIG. 12

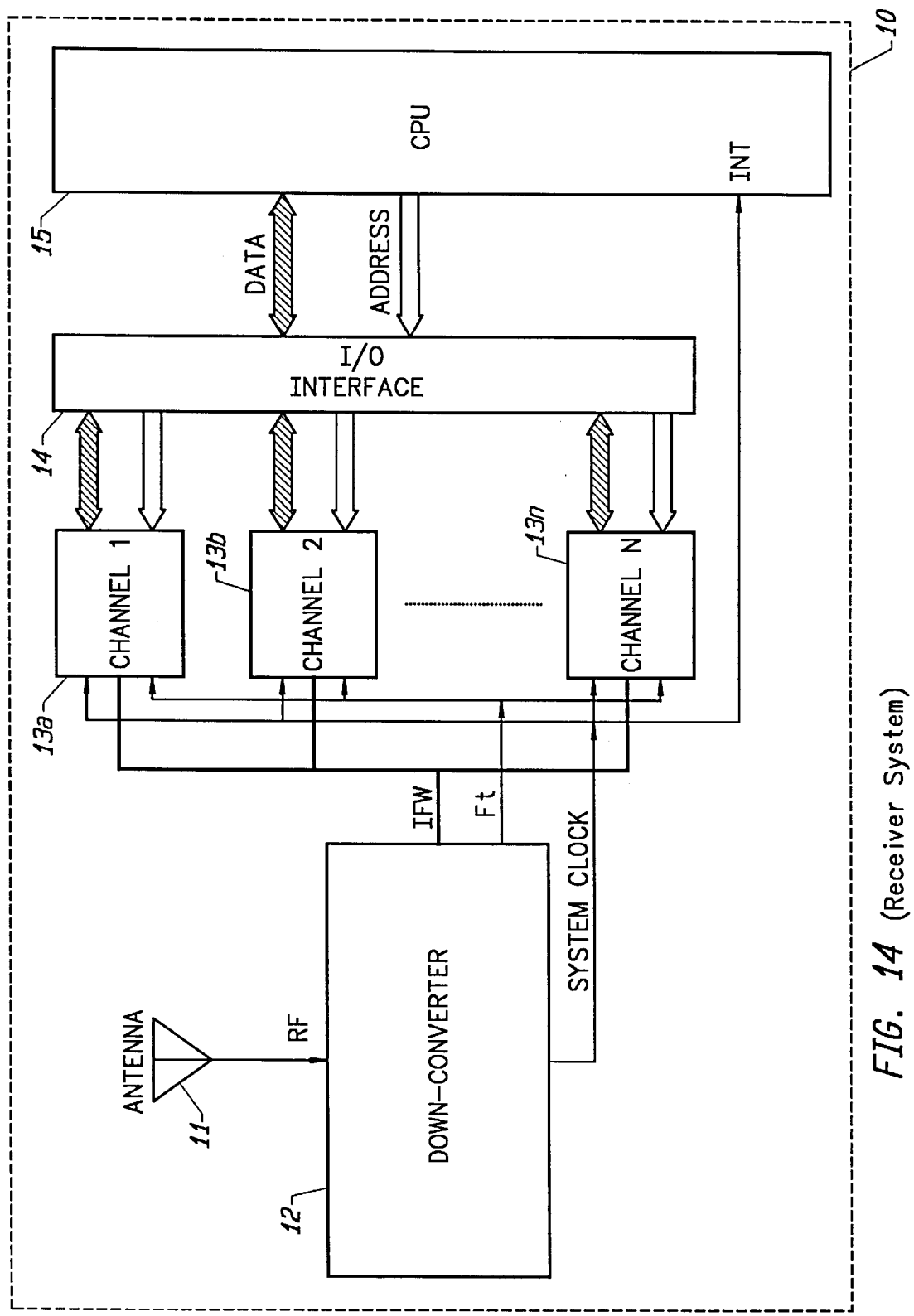
FIG. 14 (Receiver System)

(Down-Converter)

(One Channel)

(Carrier NCO)

(Correlator)

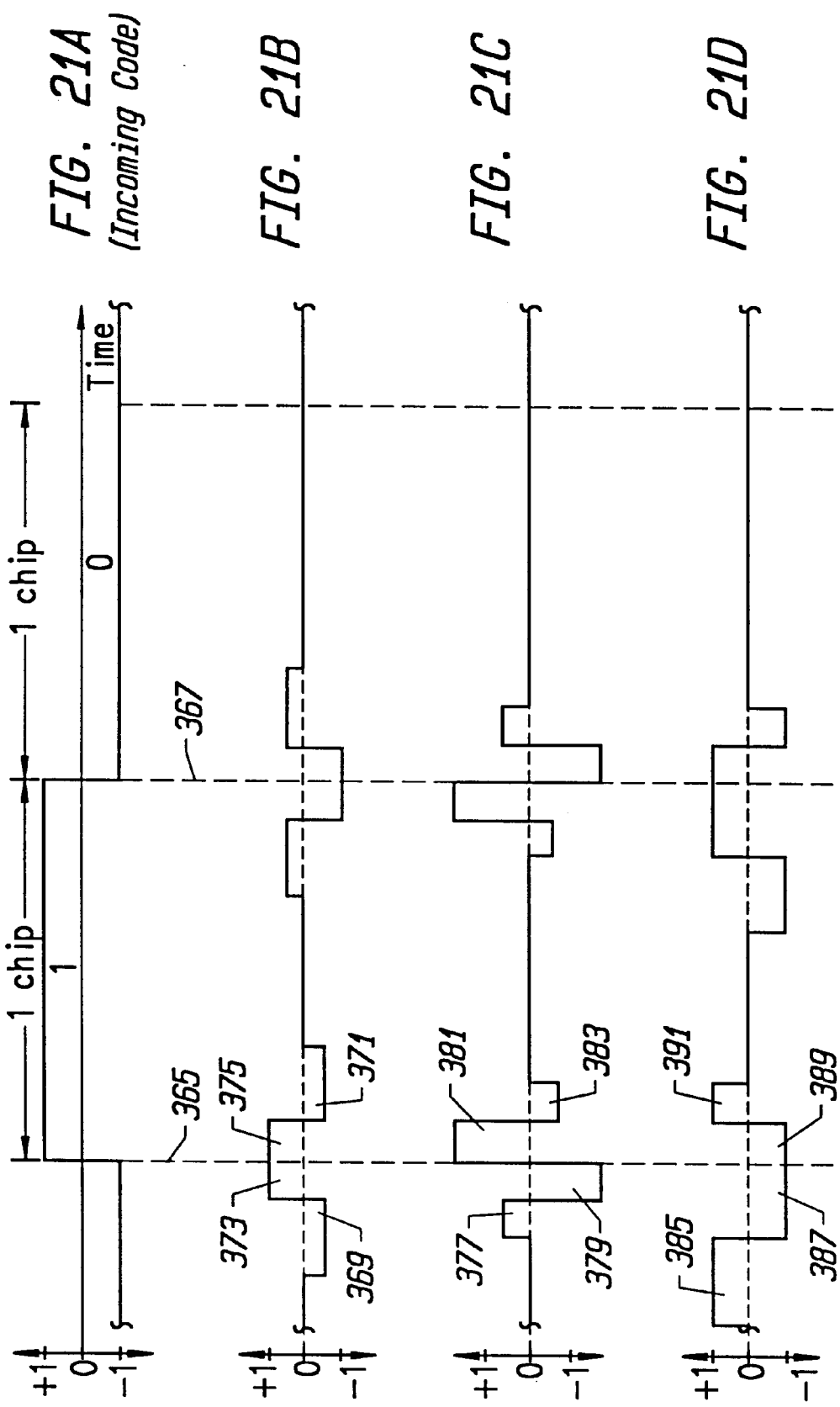

SPREAD SPECTRUM RECEIVER USING A PSEUDO-RANDOM NOISE CODE FOR RANGING APPLICATIONS IN A WAY THAT REDUCES ERRORS WHEN A MULTIPATH SIGNAL IS PRESENT

CROSS-REFERENCED TO RELATED APPLICATION

This application is a continuation of U.S. patent application Ser. No. 09/290,576, filed on Apr. 13, 1999, now abandoned, which is also a continuation of U.S. patent application Ser. No. 08/512,822, filed on Aug. 9, 1995, now issued as U.S. Pat. No. 5,953,367.

BACKGROUND OF THE INVENTION

This invention relates to digital radio receivers which are used for navigation systems and other ranging applications, wherein the received signals are encoded with a pseudo-random noise (PRN) type code. This invention deals specially with environments where the multipath fading is severe.

The United States government has placed into orbit a number of satellites as part of a global positioning system (GPS). A GPS receiver receives signals from several such satellites and can determine very accurate parameters, such as position, velocity, and time. There are both military and commercial uses. A primary military use is for a receiver in an aircraft or ship to constantly determine the position and velocity of the plane or ship. An example of a commercial use includes surveying and the accurate determination of the location of a fixed point or a distance between two fixed points, with a high degree of accuracy. Another example is the generation of a high accuracy timing reference.

In order to accomplish this, each satellite continually transmits two L-band signals. A receiver simultaneously detects the signals from several satellites and processes them to extract information from the signals in order to calculate the desired parameters, such as position, velocity or time. The United States government has adopted standards for these satellite transmissions so that others may utilize the satellite signals by building receivers for specific purposes. The satellite transmission standards are set forth in detail by an "Interface Control Document" of Rockwell International Corporation, entitled "Navstar GPS Space Segment/Navigation User Interfaces", dated Sep. 26, 1984, as revised Dec. 19, 1986.

Briefly, each satellite transmits an L1 signal on a 1575.42 Mhz carrier, usually expressed as 1540 $f_0$, where $f_0$=1.023 Mhz. A second, L2 signal transmitted by each satellite, has a carrier frequency of 1227.6 Mhz, or 1200 $f_0$. Each of these signals is modulated in the satellite by at least one pseudo-random signal function that is unique to that satellite. This results in developing a spread spectrum signal that resists radio frequency noise or intentional jamming. It also allows the L-band signals from a number of satellites to be individually identified and separated in a receiver. One such pseudo-random function is a precision code ("P-code") that modulates both of the L1 and L2 carriers in the satellite. The P-code has a 10.23 Mhz clock rate and thus causes the L1 and L2 signals to have a 20.46 Mhz bandwidth. The length of the code is seven days; that is, the P-code pattern is begun again every seven days. In addition, the L1 signal of each satellite is modulated by a second pseudo-random function, or a unique clear acquisition code ("C/A code"), having a 1.023 Mhz clock rate and repeating its pattern every one millisecond, thus containing 1023 bits. Further, the L1 carrier is also modulated by a 50 bit-per-second navigational data stream that provides certain information of satellite identification, status and the like.

In a receiver, in the process of demodulating those satellite signals, signals corresponding to the known pseudo-random functions are generated and aligned in phase with those modulated onto the satellite signals. The phase of the carriers from each satellite being tracked is measured from the results of correlating each satellite signal with a locally generated pseudo-random function. The relative phase of carrier signals from a number of satellites is a measurement that is used by a receiver to calculate the desired end quantities of distance, velocity, time, etc. Since the P-code encrypted functions (Y-code) are to be classified by the United States government so that they can be used for military purposes only, commercial users of the GPS must work directly only with the C/A code pseudo-random function.

The government of the former USSR has placed into orbit a similar satellite positioning system called GLONASS; more information on its standard can be found in the "Global Satellite Navigation System GLONASS-Interface Control Document" of the RTCA Paper No. 518-317, approved by the Glavkosmos Institute of 91/SC159-317, approved by the Glavkosmos Institute of Space Device Engineering, the official former USSR GLONASS responsible organization. Although the present invention is described herein for use with the United States GPS system, it can be applied to a receiver designed to acquire the GLONASS signals or any radio frequency system using pseudo-random noise sequences for ranging.

One of the major factors influencing the final accuracy of a distance, velocity, etc., measurement being made is the accuracy with which the signal phase measurements are made. In turn, this phase measurement precision is altered if, in addition to the direct line-of-sight propagation signal, a multipath fading signal, a multipath fading signal is also received. The phase of the C/A code, for example, is determined by use of a delay locked loop (DLL) correlator, wherein the phase of the internally generated C/A PRN code sequence is adjusted in a control loop to minimize an error signal. The DLL uses early and late versions of the internally generated code in a signal correlator that is part of it. Many such receivers use a time spacing between the early and late versions of one PRN code chip. (A "chip" is the time during which the code remains at a plus or minus one.) Operation of the DLL within such receivers is affected by any multipath signal present, thus causing a tracking error. The phase locked condition of the DLL is not only controlled by the line-of-sight signal, as is desired in order to eliminate a cause of phase measurement errors, but rather is affected by the multipath signals as well.

Errors caused by multipath distortion in the out-of-phase condition can be reduced by narrowing the delay spacing between the early and late correlators in the DLL. Although this technique reduces the effect of the received multipath signals somewhat by reducing the loop gain to the weaker multipath signals, inaccuracies still result. The tracking error is never completely eliminated by simply narrowing the early-late delay spacing, no matter what delay in a multipath signal exists.

Therefore, it is a primary and general object of the present invention to further reduce, and even, in some cases, eliminate phase measurement errors that result when one or more multipath versions of a PRN encoded signal are present.

SUMMARY OF THE INVENTION

This and additional objects of the present invention are realized, briefly and generally, by providing a DLL correlator having a zero loop gain over a majority of a range of relative phase difference between the locally generated PRN code and that encoded in the radio frequency signal being received from a satellite or other source, while, at the same time, providing a finite magnitude of loop gain in an operating phase difference region positioned about a zero phase difference. That is, the DLL operates to minimize the error signal for a received signal having a relative phase within a narrow operating phase window and is thus unaffected by multipath versions of that signal which are outside of the window in a region where the loop gain is zero. The present invention exhibits a code loop error which goes practically to zero for far multipath delay, virtually eliminating the influence of the far multipath on the pseudorange measurement accuracy. This improvement is not obtained at the expense of the performances on near multipath, however, in which case the performance is similar to that of the narrow correlator.

In one form of the invention, the radio frequency signal is initially acquired by operating the DLL as a narrow correlator, where there is some gain over the entire range of relative phase differences. After the signal has been acquired by locking the DLL onto a combination of the line-of-sight and multipath signals, the DLL is switched to provide a loop gain in only the small central region of the combination of the line-of-sight and multipath signals, thereby discriminating against the multipath signals.

According to one specific aspect of the present invention, this DLL response is obtained by providing more than one early-late correlator in parallel, with the early-late delays being different. The results of the correlations are arithmetically combined. The size of the central relative phase operating range of the loop response is set by the specific early-late delay values chosen for the correlators. In the embodiment described hereinafter, two correlators are used, one correlator having an early-late delay of 0.1 chip and the other correlator having a delay of 0.05 chip. During an initial acquisition of the radio frequency signal, only the wider early-late correlator is used.

According to another specific aspect of the present invention, the desired DLL responses are obtained by using specific gating signals in combination with an accumulator/integrator, rather than using early-late versions of the locally generated PRN code. These gating signals are significantly less than one chip in duration and, when in phase with the incoming signal code, occur at each transition of that code between its plus one and negative one values. The gating signals have equal positive and negative areas and have a positive or negative polarity at a center that designates whether the PRN code transition that it represents is positive or negative going. During initial acquisition of the radio frequency signal, the gating signals are shaped as simple positive or negative going pulses occurring at code transitions.

Additional objects, advantages and features of the various aspects of the present invention will become apparent from the following description of its preferred embodiments, which description should be taken in conjunction with the accompanying drawings.

BRIEF DESCRIPTION OF THE DRAWINGS

FIG. 1 illustrates line-of-sight and multipath signals being received simultaneously by a GPS receiver;

FIGS. 2 and 3 show the line-of-sight and multipath signals in vector form;

FIG. 4 is a general block diagram of a delay locked loop (DLL) correlator;

FIGS. 5A–5D are curves showing one operation of the circuit of FIG. 4;

FIGS. 6A–6C are curves showing another operation of the circuit of FIG. 4;

FIGS. 7 and 8 are block diagrams showing other DLL circuits that are alternatives to that of FIG. 4;

FIGS. 9A–9D are curves which illustrate operation of the DLL circuits of FIGS. 7 and 8;

FIG. 10 generally illustrates another type of correlator which uses gating signals for local code generation;

FIGS. 11A–11D illustrate several ways of operating the circuit of FIG. 10;

FIG. 12 is an enlarged version of a portion of FIG. 11D;

FIG. 13 shows the results of operating the DLL correlators of FIGS. 7, 8 and 12 in three different ways;

FIG. 14 is a block diagram of a complete receiver embodying the various aspects of the present invention;

FIGS. 21A–21D illustrate alternate gating signals that may be generated in the circuit of FIG. 10.

DESCRIPTION OF THE PREFERRED EMBODIMENTS

Figure 15:
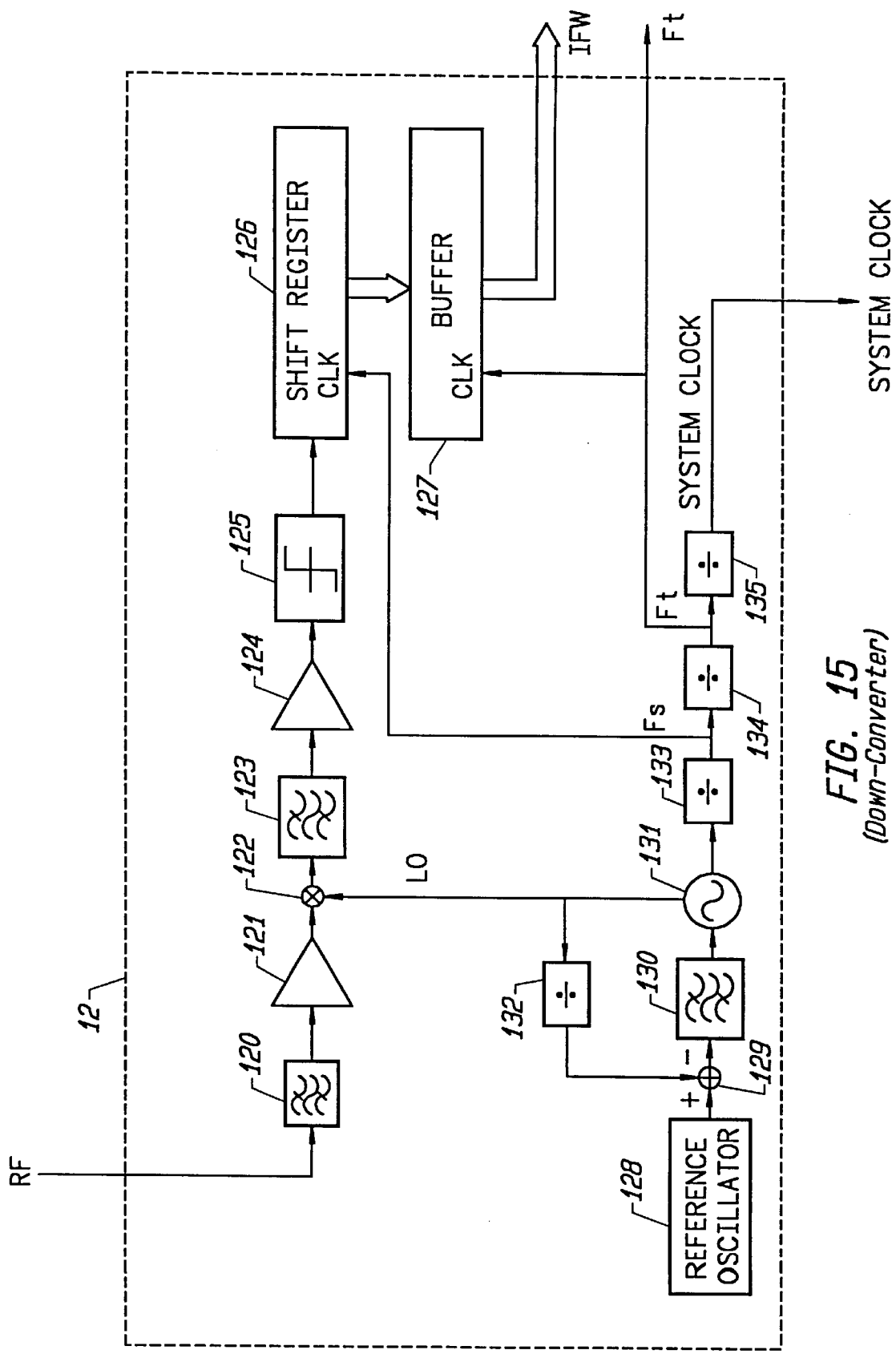
FIG. 15 is a block diagram of the down converter circuit of the receiver of FIG. 14, along with timing reference circuitry and sampling.

Referring to FIG. 1, the various aspects of the present invention are described with respect to a global positioning system (GPS). A GPS receiver 201 includes an antenna 203 which is positioned to receive a signal 205 from a satellite 207. In addition to the desired line-of-sight signal 205 received directly from the satellite 207, the antenna 203 also receives a second version of that signal, a delayed multipath signal 209. The multipath signal is delayed because it reaches the antenna 203 by traversing a longer distance than does the line-of-sight signal 205. The multipath signal is shown in FIG. 1 to reflect off of a hill 211, or some other object. Although the present invention is explained simply with reference to a single multipath signal, there can be several delayed versions of the line-of-sight signal which are also received by the antenna 203 at the same time. Since GPS receivers, and other ranging receivers used in other applications, operate by measuring the phase of the received signal, a multipath signal can complicate that task considerably.

Various attempts have been made in antenna design to limit the acceptance of reflected signals. This is difficult, however, because it is generally desired to have the antennas maintain a wide angle property in order to receive signals from several satellites at one time that are spread a considerable distance apart. Attempts have also been made to position the antenna as high as possible, in order to minimize ground and building reflections, or to carefully position it to avoid receiving reflected signals. Although these techniques may be used in conjunction with the present invention, the present invention uses various signal processing techniques within the receiver itself to discriminate against the received multipath signals.

Referring to FIGS. 2 and 3, a vector 213 represents the received line-of-sight signal, while another vector 215 represents the received multipath signal. The multipath signal 215 arrives at the receiver antenna 203 with a delay τ relative to the line-of-sight signal 213. It is shown in these figures, the multipath signal generally has a lower magnitude than does the line of sight signal as illustrated by it smaller vector 215. A ratio of these magnitudes is noted herein by α.

A delay lock loop (DLL) correlator that is typically used in GPS receivers is shown in FIG. 4. A received signal 217 may be radio frequency signal acquired by the antenna 203, after some amplification, but generally is an intermediate frequency signal in a frequency range much lower than that received by the antenna 203. Further, in the GPS receiver environment, a separate such DLL correlator is provided for each satellite signal that is received by the receiver antenna in a single composite signal. One DLL correlator then processes that portion of the incoming signal that emanates from a particular satellite. Further, the signal processing illustrated in FIG. 4 is generally done in the digital domain, an analog-to-converter being employed to digitize the incoming intermediate frequency signal. That signal is digitized by a very high frequency sampling clock.

The received signal 217, in whatever form, is mixed in a mixer 219 with a signal 221 that is a replica of the carrier of the received signal 217. This local carrier is generated by an appropriate circuit 223, the phase of the local carrier signal 221 being adjusted by an input control signal 225. A loop circuit to lock the carrier generator 223 onto that of the received signal is not shown in FIG. 4 since it can be of a typical design. However, the processing of a signal 227 at an output of the mixer 219 is shown in more detail since it is in this processing where the present invention primarily lies. The signal 227 is the received signal but with its carrier now removed. It is supplied to two mixers 229 and 231 which receive replicas 228 and 230 of a PRN code carried by the received signal. These replicas are, respectively, "early" and "late" in relative phase with respect to a "punctual" replica 245. These replicas come from a local code generator 233 within the receiver. In at least the case of the C/A code in the GPS system, the code carried by the received signal is well known and can be generated within the receivers. The relative phase of the locally generated code is adjusted by a phase control signal 235. Further, in some receivers, another input 237 to the local code generator 233 allows adjustment of the delay between an early and late replicas of the locally generated code.

Outputs of each of the mixers 229 and 231 are applied to appropriate accumulators/integrators 239 and 241, respectively. The outputs of the accumulators 239 and 241 are arithmetically combined in another mixture 243, whose output is an error signal that is applied to the input 235 of the local code generator 233 to adjust its phase. What the loop of FIG. 4 is designed to do is to lock the local code generator 233 in phase with the code carried by the received signal 217. Although this is being described with respect to the C/A code carried by the L1 signals of GPS satellites, the same principles are applicable in a wide variety of applications, particularly in other ranging applications.

It is helpful to refer to the curves of FIGS. 5A–5D to understand the operation of the DLL correlator of FIG. 4. If the punctual output 245 of the local code generator 233 were to be applied to an. accumulator of the type of accumulator/integrator 239 or 241, an output characteristic as shown in FIG. 5A would result. If this punctual code replica is exactly in phase with the PRN code of the received signal 217, an output of such an accumulator would be a maximum at a center line 247 of the triangular shape output characteristic of FIG. 5A. If there is some misalignment in phase between the two, the output of such an accumulator would decrease from such a peak as it travelled down one side or the other of the triangle depending upon whether the local punctual code being generated was delayed or advanced with respect to the PRN code of the received signal.

Although the punctual output of the local code generator 233 is usually used for other purposes in a GPS receiver, the DLL correlator of FIG. 4 operates with the early and late versions 228 and 230 of that code. FIG. 5B shows the characteristic output of the accumulator 239 from a comparison with the local early code, and the curve of FIG. 5C the output function of the accumulator 241 from a comparison with the local late code. In this typical example, the early and late locally generated PRN codes are separated by one chip. That is, the late code 230 is delayed behind the early signal 228 one PRN chip. This fixed delay is designated herein as "d" and is shown in FIG. 5B. To state it another way, as shown in relative phase scale along the x-axis of FIG. 5B, the early code function occurs one half a chip in advance of the punctual version, and the late code occurs one half a chip after the punctual version. It is often convenient to reference the early and late correlator outputs, such as shown in FIGS. 5B and 5C, to a central, in-phase line 247.

FIG. 5D shows the error signal 235, resulting from subtracting the correlator function of FIG. 5C from that of FIG. 5B. The result is a zero error signal at the in-phase point 247 when the local code generator 233 is properly locked onto the PRN code that is part of the received signal 217. As a mismatch in phase occurs, as is well known, the error signal will be driven positive or negative along the curve of FIG. 5D. Such an error signal drives the phase of the local code generator 233 in a direction to minimize the error signal, thus keeping the local generator 233 locked onto the incoming signal.

However, if one or more multipath signals are received in addition to the desired line-of-sight signal, the DLL correlator of FIG. 4 is influenced by both. This is illustrated in FIG. 5D. If only the line-of-sight signal 213 existed, the circuit of FIG. 4 would cause it to be aligned with the central zero phase reference line 247. However, because of the multipath signal 215 being received, the local code generator 233 "locks" on a fictitious signal having a phase somewhere around them, as shown in FIG. 5D. That is, the circuit of FIG. 4 is locking on to an incoming code phase that lies somewhere between that of the line-of-sight and multipath signals. Even though the magnitude of the multipath signal may be low with respect to that of the line-of-sight signal, because of attenuation from reflections of the multipath signal, its effect can be significant because of the steep curve of FIG. 5D. It is a combination of the multipath signal magnitude and the value of the curve at the point of the arrow 215, that determines the level of effect of the multipath signal on this phase lock operation. The line-of-sight signal vector 213 will operate around the in-phase point 241 from that of the multipath signal vector 215. Thus, since measurements with the GPS receiver are largely dependent upon an accurate measurement of the relative phase at the point of the receiver of the C/A code in the satellite signals, this effect of a multipath signal is quite significant to the accuracy of the ultimate measurement.

It has been suggested by others that, in order to reduce the effect of a multipath signal, the delay between the early and late local codes being generated into the receiver should be reduced considerably. An effect of a delay d=0.1 chip is shown in FIGS. 6A–6C. The output of the early accumulator 239 in this case is shown in FIG. 6A. Similarly, an output of the late accumulator 241 of FIG. 4 is shown in FIG. 6B. The error signal output of the adder-subtractor 243 is shown in FIG. 6C. It will be noticed that since the amplitude of the error signal function is considerably reduced, the multipath signal 215 has a significantly reduced effect. As can be seen from FIG. 6C, the magnitude of the error signal curve at the relative phase of the multipath signal vector 215 is much less than in the example of FIG. 5B. The result is that, in a steady state phase lock state shown in FIG. 6C, the line-of-sight signal vector 213 is positioned much closer to a desired phase locked position 247 than is the line-of-sight signal.

However, as can be seen from FIG. 6C, the DLL correlator of FIG. 4 operating with an early-late local PRN code phase difference of one tenth of one chip, the DLL still has not locked on the line of sight signal. An error $\epsilon$ is reduced in FIG. 6C from FIG. 5D but is not eliminated. The multipath signal has an effect in creating this error and thus reducing the accuracy by which a GPS receiver may achieve. According to one aspect of the present invention, the effect of multipath signals is eliminated under certain circumstances and further reduced under other circumstances, by forming a DLL correlator of the type shown in FIG. 7 wherein two early-late correlations are arithmetically combined. Referring to FIG. 7, an output 227 of the carrier mixer 219 is applied to two correlators connected in parallel. A first correlator includes mixers 251 and 253, the outputs of which are applied to an adder-subtractor 255. An output of the latter mixer is then applied to an accumulator/integrator 257. Similarly, the second correlator includes mixers 259 and 261, the outputs of which are applied to an adder-subtractor 263. An output of that adder-subtractor is applied to and accumulator/integrator 265.

The mixer 251 of the first correlator receives an early code replica 267 from a local code generator (not shown in FIG. 7). Similarly, the mixer 253 receives a late code replica 269. The result is an output 271 of the accumulator having a form shown in FIG. 9A. The delay between the early and late replicas 267 and 269, respectively, is designated to be d. This is the same as specifying the early signal 267 to be d/2 ahead of the central reference phase 279 (FIG. 9) and the late local code 269 being d/2 behind that reference t. It will be recognized that the output 271 shown in FIG. 9A is similar in shape to that of FIG. 6C.

Rather than relying simply on that correlator output, however, the second correlator receives in lines 273 and 275 a locally generated code having a difference between the early and late locally generated codes that is 2d apart. An output 277 of the accumulator 265 is illustrated in FIG. 9B. It will be noted that the curve of FIG. 9B also generally has the same shape as that of FIG. 6C but is different than that of FIG. 9A in having a longer slope central portion. This also results in the magnitude in the flat portions of the curve being higher than that of the curve of FIG. 9A.

It is in the combination of these two outputs in another adder-subtractor 283 that an error signal 285. of the form illustrated in FIG. 9D is obtained. This characteristic is very advantageous since it contains extended portions 287 and 289 where the error signal is zero. This is accomplished, prior to combining the accumulator outputs 271 and 277 in the mixer 283, by reducing the magnitude of the accumulator output 277 by one half with an element 278, resulting in the curve of FIG. 9C. This attenuation level is mathematically related to the difference in the widths of the two early-late correlators. The curve of FIG. 9C is, in effect, subtracted from that of FIG. 9A in the adder-subtractor 283, which gives the desirable error signal characteristic curve of FIG. 9D. An operating range 281 exists around the in-phase point 279 wherein the circuit of FIG. 7 adjusts the local code generator to drive the error signal of FIG. 9D to zero at the in-phase point 279. However, any signal having a relative phase in either of the regions. 287 or 289 will not affect the locking of the loop. As shown in FIG. 9D, the local code generator can be locked exactly on the line-of-sight signal 213 without any contribution by the multipath signal 215. This occurs so long as the phase delay $\tau$ between the vectors 213 and 215, in a fraction of a chip, is greater than that of the operating range 281. Thus, under that circumstance, the effect of the multipath signal on the DLL correlator is completely eliminated.

Because of the wide extent of the zero error signal regions 287 and 289, it can be difficult to initially acquire a signal. That is, when the receiver is first powered up, if the relative phase of the local code generator causes the line-of-sight signal 213 to fall within one of the regions 287 and 289, there will be no error signal to adjust the phase of the local codes being generated. Therefore, a switch 291 (FIG. 7) is provided to disconnect the second correlator from the circuit during initial signal acquisition. Thus, during such acquisition, the correlator characteristic output of FIG. 9B is non-exist but rather that of FIG. 9A. Thus, the multipath signal has some influence during this initial signal acquisition period but it is the purpose of the technique to bring the line-of-sight signal 213 within the operating range 281. Once this occurs, the switch 291 is closed. This then eliminates the influence of the multipath signal. The DLL correlator brings the line-of-sight signal 213 exactly in coincidence with the in phase position 279.

Quantitatively, a d=0.1 chip has been found satisfactory. This means that the operating range 281 is 0.1 chip, a very narrow region. In this example, the early-late of the second correlator whose output is illustrated in FIG. 9B is twice that of a first correlator whose output is shown in FIG. 9A. This results in each of the zero error signal regions 287 and 289 being 0.8 chip in duration, 80% of a possible relative phase difference is between the locally generated code and the PRN code that is part of the signal being received.

There are many variations in the specific parameters that can be selected for operation of the correlator of FIGS. 7 and 9. The specific early-late phase differences that are chosen for the two correlators may be within a wide range, so long as they are different, depending upon a particular application and what is desired to be achieved. It is generally preferable, however, that one of the two correlators of FIG. 7 have an early PRN code that is one 1/2K earlier than the in-phase locked position t, and its late PRN code 1/2K after t. Similarly, the second correlator has an early PRN code N/2K ahead of t, and a late PRN code N/2K after t. N and K are integers with N being smaller than K. In the example being described, N=2 and K=10. If these constraints are followed, the scaling factor of the element 278 of FIG. 7 remains at 1/2. If some other relationship between the two correlators is maintained, that scaling factor will generally need to be something different so that extended zero error signal regions 287 and 289 result when the accumulator output of FIG. 9C is subtracted from that of FIG. 9A.

FIG. 8 shows a modification of FIG. 7 wherein four accumulators are used, instead of the two accumulators 257 and 265 of FIG. 7. The purpose of FIG. 8 is to show that the same result is obtained if the outputs of each of the individual mixers 251, 253, 259 and 261 are accumulated prior to any combination of any of those outputs. An adder-subtractor 293 then receives outputs of the four accumulators, two of which now need to be scaled and switched rather than the single output 277 of FIG. 7.

An alternative to the use of early-late correlators, but which gives the same beneficial results, is illustrated in FIG. 10. A received signal 301, as previously described with respect to FIGS. 4, 7 and 8, is applied to a mixer 303 which also receives a replica 305 of the carrier contained in the signal 301. A signal 307, having a local carrier removed, is mixed in a mixer 339 with a gating sequence 341 from a local gating signal generator 343. The mixed signal output of the mixer 339 is applied to an accumulator/integrator 345 whose output 347 is the error signal that is used to adjust the phase of the output of the local gating signal generator 343 to minimize the error signal.

Operation of the DLL correlator of FIG. 10 can be illustrated by reference to the curves of FIG. 11. FIG. 11A illustrates PRN code that is modulated onto a carrier as part of the received signal 301. The code is a binary one, either being a plus one in level or a negative one in level. One of these levels is chosen to represent a binary bit one, and the other a binary bit zero. Transitions between these levels occur at one chip intervals. The code does not transition between levels every chip, however, but rather its information is contained in the pseudo-random manner in which it stays for one or more chips at one value and then switches to another value for one or more chips, and then back again, and so on.

FIG. 11B shows one gating sequence 341 that may be utilized, it having a positive one value at each positive going transition of the incoming code of FIG. 11 A, and a negative one value at each negative going transition of the incoming code. The gating sequence 341 is zero (FIG. 11B) when there is no transition where such a transition is possible. The transition of the gating sequence of FIG. 11B coincides with a middle of each chip of the incoming code. The result of using the gating sequence of FIG. 11B is an error signal 347 which has essentially the same function as that shown in FIG. 5D. That is, the DLL correlator of FIG. 10, when its gating sequence 341 is that of FIG. 11B, provides essentially the same result as the DLL correlator of FIG. 4 with its locally generated early-late PRN codes separated by one chip.

FIG. 11C shows a gating sequence 341 which gives an error signal 347 that is essentially the same as that shown in FIG. 6C. Coincident with each transition of the incoming code 11A is a pulse having a duration of 0.1 chip. The polarity of the pulse is positive during a positive transition of the incoming code and negative during a negative transition of the incoming code. The width of the pulse can be something other than 0.1 chip, which will then give an error signal function that is something different than that shown in FIG. 6C.

FIG. 11D shows a local gating sequence according to one aspect of the present invention. Use of this form of the gating sequence 341 (FIG. 10), gives an error signal 347 having essentially the same function as that shown in FIG. 9D. In order to achieve this, the gating sequence includes, coincident with the occurrence of each transition of the incoming code of FIG. 11A, a pulse that has both positive and negative values. The gating sequence 341 is a zero value in between these pulse functions. These pulse functions are considerably less than one chip in duration. Each pulse function has equal positive and negative areas. When phase lock is achieved, a central portion of the pulse function of FIG. 11D is aligned with the transition of the incoming code of FIG. 11A. If that transition is positive going, then the polarity of the central portion of the pulse function of FIG. 11D is of one polarity, and if the incoming code transition is negative going, that pulse function central portion has an opposite polarity. In FIG. 11D, it is shown that the central portion at a time 349 coincident with a positive going edge of the incoming code of FIG. 11A is positive, and that the pulse function central portion at a time 351 coincident with a negative going edge of the incoming code of FIG. 11A is negative, but these may be reversed.

Referring to FIG. 12, characteristics of the pulse functions of FIG. 11D will be explained with respect to the expanded scale diagram. A single pulse function occurring about the incoming code transition 349 can be viewed as having four distinct adjacent components. A central portion of the pulse function have areas 353 and 355 that are equal in area to each other on opposite sides of the transition line 349 when the error signal of the correlator of FIG. 10 is minimized. Areas 357 and 359 have an opposite polarity to areas 353 and 355 and occur, respectively, ahead of and behind the pulse function areas 353 and 355. The areas 353 and 357 are caused to equal each other. Similarly, the areas 355 and 359 are caused to equal each other. In the specific example being described, the areas 353 and 355 have a width of 0.1 chip with a plus 1 magnitude while each of the areas 357 and 359 has a width of one half that or 0.05 chip, with a minus one magnitude.

Referring to FIG. 13, curves are given to illustrate the relative tracking error boundaries for various multipath signals having different values of delay from the line of sight signal desired to be locked onto. The outer-curves 361 and 363 show the results of operating the DLL correlator of FIG. 4 in a manner described with respect to the curves of FIG. 5. The dashed lines 365 and 367 illustrate operation of the DLL correlator of FIG. 4 in accordance with the curves of FIG. 6, as described previously. It can be seen that the tracking error is considerably reduced but still is significant. A curve 369 of FIG. 13 shows how the error is considerably reduced when one of the DLL correlators of FIGS. 7 or 8, as explained with respect to the curves of FIG. 9, is utilized. The same result, illustrated by the curve 369, occurs by using the gating sequence of FIG. 11D with the correlator of FIG. 10, as previously described. It will be noted from the curve 369 that multipath signals which are delayed from the line of sight signal by any significant amount do not affect the tracking at all.

More specifically, FIG. 13 shows in nanoseconds (ns) the envelope of zero tracking error for the three DLL correlators $\epsilon$ versus the delay $\tau$ in ns, for a ratio $\alpha$ of the magnitude of the multipath signal to that of the line-of-sight signal is 0.5 with $\theta$ varying between $-\pi$ and $+\pi$. It is obvious that for $\tau$ between 0 and 10 ns, the zero tracking error is roughly identical for the three correlators, and for $\tau$ around 100 ns the advantage is clearly in favor of the 0.1 chip edge DLL. After 150 ns, the zero tracking error becomes negligible for the d=0.1 chip edge correlator, whereas it stays at 30 ns in the narrow correlator and above and increasing for the 1 chip wide correlator. Conceptually, the edge DLL correlator used on C/A code is equivalent to a DLL correlator used on P code, and has the same beneficial multipath mitigation properties.

Embodiment of a GPS Receiver

The following description is mainly oriented towards the United States' Global Positioning System (GPS); however it can also be applied to the Common Independent States' GLObal NAvigation Satellite System (GLONASS) as well, or to any ranging system using a PRN sequence. This embodiment is described with one bit quantization; this choice, made for the sake of the simplicity of the description, does not preclude any constraint on the quantization.

Referring to FIG. 14, a general block diagram of a pseudo-random noise (PRN) receiver 10 that implements the present invention. The receiver 10 includes an antenna 11, a downconverter 12, multiple channels 13a to 13n, an input/output interface 14, and a digital processor 15. The antenna 11 receives a composite signal RF, composed of signals from all satellites in the system that are directly in the line of sight of the antenna. The composite signal RF is fed to the down-converter 12 to provide a quantized and sampled intermediate frequency signal IFW, a system sampling clock Ft and a SYSTEM CLOCK.

The signal IFW is a word of 4 bits, each representing one of four IF consecutive samples at a FS sampling rate. The processing clock Ft is a division by 4 of the Fs signal. The system clock is a further division of Ft signal, interrupting the processor at a rate of approximately 1 per millisecond and triggering the channel processing.

Referring to FIG. 15, the down-converter is discussed. The RF signal is first prefiltered by the RF filter 120, amplified by 121, and mixed with the Local Oscillator (LO) by the mixer 122, filtered and amplified again in IF by 123 and 124, and finally quantized in one bit by the hard limiter 125. The filter 123 is in fact used as a pre-correlation filter with a two-sided bandwidth of 20.46 Mhz. The instantaneous hard limiter output is sampled at a rate of Fs, and shifted in the 4-stage shift register 126. The sampling rate Fs is chosen to satisfy the Nyquist rate requirement, related to the pre-correlation filter bandwidth. Every Ft clock transition (i.e. 4 Fs clocks), the full contents of the shift register is transferred into a parallel register 127. The 4 bit word IFW is then transferred to the channel circuits at a Ft rate for satellite individual tracking.

The clock reference circuitry of the down converter (FIG. 15) includes a phase lock loop (PLL) which is composed itself of the voltage controlled oscillator (VCO) 131, a frequency divider 132, a phase comparator 129, which compares the phase with a stable reference oscillator 128, and, finally, a low frequency loop filter 130. The VCO output is used as local oscillator for the RF section. The frequency of the VCO 131 is divided in several steps, a first time by a divider 133 to get the sampling frequency Fs, a second time by a divider 134 to get the processing clock Ft, and a third time by a divider 135 to get the SYSTEM CLOCK.

As shown in FIG. 14, the sampled and quantized intermediate frequency signal IFW is simultaneously fed to each of the several signal processing channels 13a to 13n. A separate channel 13 is devoted to every visible satellite; the assignment to a given satellite is made by configuring the pseudo-random noise (PRN) generator through the PRN GENERATOR COMMANDS. The structure of a channel 13, typical of each of the channels 13a–13n, is given in FIG. 16. Every satellite signal is simultaneously tracked in carrier phase by a carrier Phase Lock Loop(PLL) and in code phase by a Delay Lock Loop (DLL). All channel processing is made in a fully synchronous manner at a processing clock Ft. IFW samples are processed 4 by 4, and all carrier and code generation is made at Ft rate by groups of 4 as well.

Both the PLL and the DLL are implemented partly in the channel 13, and partly in the processor 15. The link is made by the I/O interface 14. The loop comparators and the loop actuators are located in each channel, whereas the filter implementation and the loop management are handled by the processor 15. The loops are updated when the processor is interrupted by the SYSTEM CLOCK signal and the MEAS READY signal is set for that channel, informing the processor that a measurement cycle has just finished. All measurement cycles are chosen at a period bigger than that of the SYSTEM CLOCK, in order not to miss any measurement. The cycle period is set by the processor at every channel initialization, through the PRN GENERATOR COMMAND.

The carrier PLL uses the measurements I and Q of an in-phase correlator 130a, and a quadrature phase correlator 130b. In a tracking mode, the PLL drives the information Q to zero while checking for the presence of the signal locking on I. Both correlators are using the. same "punctual" pseudo-random code (PRN) for the correlation, but use different carrier signals COS and SIN. The processed information is used to control the CARRIER FREQUENCY COMMAND of a carrier numerically controlled oscillator (NCO) 132.

Figure 17:
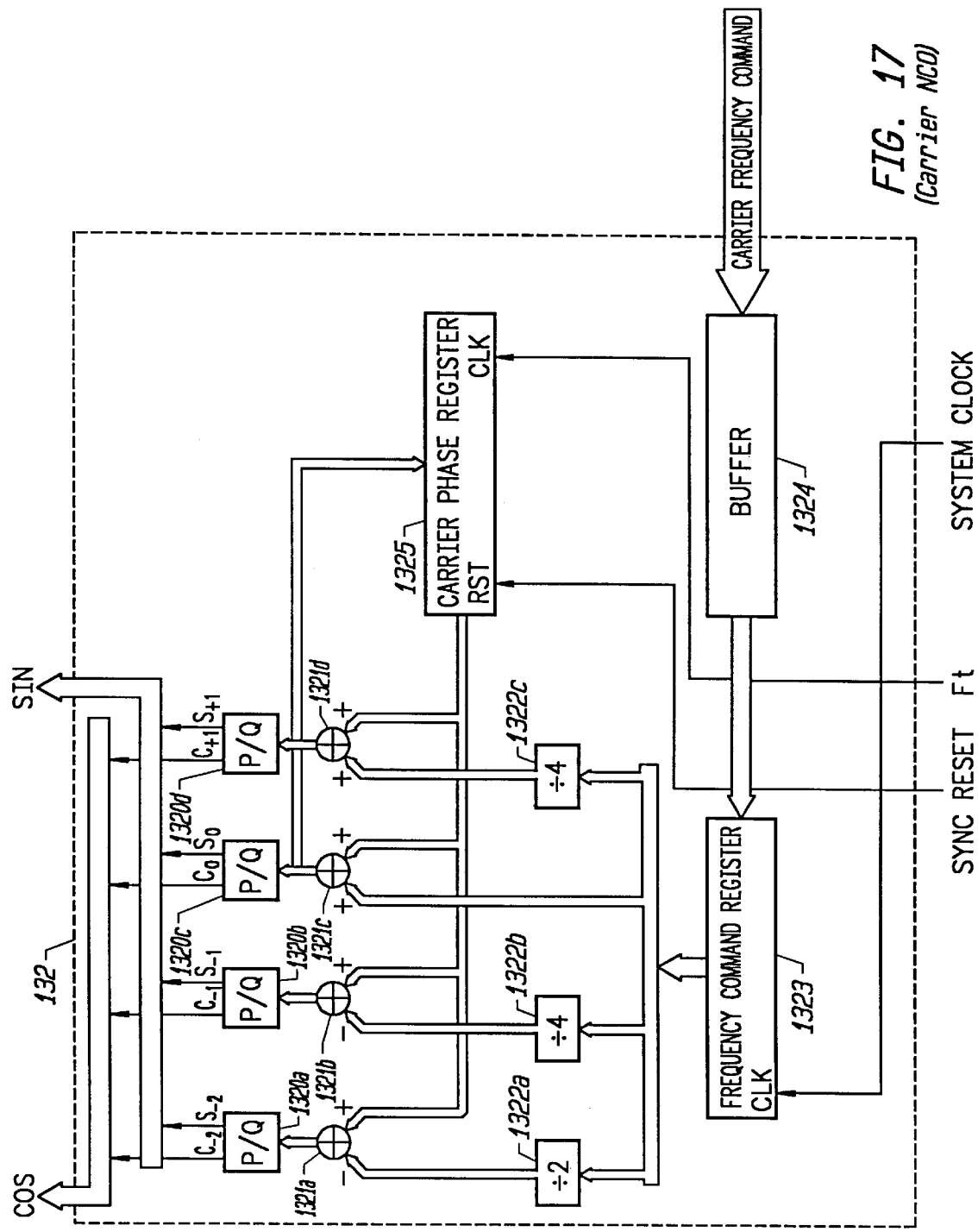
FIG. 17 shows a carrier numerically controlled oscillator used in each of the channels of FIG. 15 in the receiver of FIG. 14.

The carrier NCO 132 is described in detail in FIG. 17. The instantaneous carrier phase image is kept in a carrier phase register 1325, where the total range represents $2\pi$ of carrier phase. The current CARRIER FREQUENCY COMMAND is kept in a frequency command register 1323. At every Ft transition, this value is added to the current carrier phase register contents by the adder 1321c; thus, the carrier phase is incremented one full cycle every time the carrier phase register 1325 cycles back to zero.

The instantaneous carrier phase can be obtained at any SYSTEM CLOCK transition or at every Ft very straightforwardly; the carrier phase register 1325 is reset synchronously with the SYSTEM CLOCK at the initial CHANNEL RESET command, ensuring a known initial phase. Every processor command loaded into a buffer 1324 is transferred into the frequency command register 1323 and effective at the next SYSTEM CLOCK transition; as the SYSTEM CLOCK period is an exact number of Ft periods and knowing the loaded command word, the exact value in the carrier phase register is obtained at the next SYSTEM CLOCK transition or at any Ft clock transition in between by direct computation.

The one bit reference carrier cosine value $C_0$ is obtained by "exclusively ORing" the most significant bit (MSB) and the second most significant bit of the carrier phase register contents. The one bit reference carrier sine value is obtained using the MSB of carrier phase register contents; this is actually done in the phase/quadrature signal generator 1320c.

As the samples are processed 4 by 4, the carrier references are generated synchronously with the exact sampling times for the 3 other samples as well. Arbitrarily and for simplicity of implementation, the reference signal is chosen to be the third of the sequence of 4.

If may be noted that the carrier phase 1325 is physically incremented by the frequency command value 1323 every Ft. It is equivalent to say that the instantaneous carrier phase is virtually incremented by a fourth of this value every Fs (i.e. four times per Ft period). As a result, the reference carrier phase synchronous with the fourth sample (most recent one) is obtained by adding frequency command divided by four (divider 1322c) to the current carrier phase

1325; the carrier cosine (sine) value $C_{+1}$ ($S_{+1}$), delayed of one sampling period, is obtained from it with the phase quadrature signal Generator 1320d using the same algorithm as for $C_0$ and $S_0$.

Similarly, $C_{-2}$, $S_{-2}$ are obtained by subtracting frequency command value divided by 2 using 1322a from the current carrier phase 1325. This substraction is performed by using the adder 1321a. The cosine and sine values are finally obtained through 1320a.

Finally $C_{-1}, S_{-1}$ are obtained by subtracting the frequency command value divided by 4 using 1322b from the current carrier phase 1325. This substraction is made using the adder 1321b. The cosine and sine values are finally obtained through 1320b.

Figure 19:
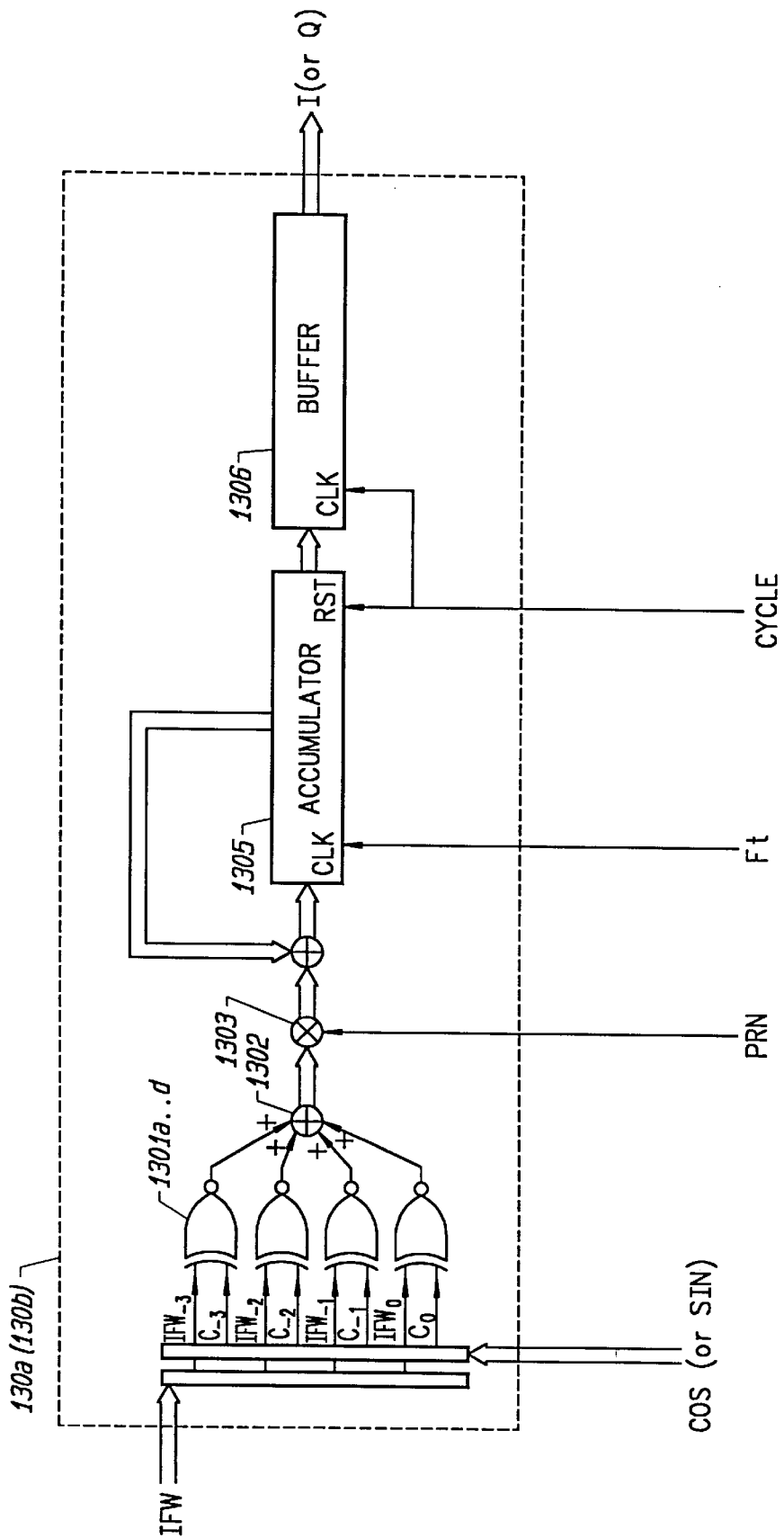
FIG. 19 is a block diagram of the punctual correlator used in the channel circuit of FIG. 16.

The full NCO output is a "cosine" word COS and a "sine" word SIN of 4 bits each, each bit being the sampled carrier reference value one sample apart. The "punctual" in-phase (130a) and quadrature-phase (130b) correlators for the PLL are described in FIG. 19. Given the close similarity, the following correlator description deals with only the in-phase case.

The intermediate frequency word IFW composed of 4 samples is "exclusive ORed" with the 4 bit cosine carrier reference COS in the structure 1301a to 1301d. All samples are added in the adder 1302; the result is comprised between −4 and +4 (the "0"values are processed as "−1"by the adder 1302). The result is then multiplied by the value of reference PRN sequence synchronous with the most recent sample (multiplier 1303). The resulting value is then algebraically added at a Ft rate to the current contents of the accumulator 1305. At every CYCLE transition the accumulator value is transferred to the buffer, the accumulator is reset, and finally a new measurement period is initiated. The processor is then able to read the measurement values to close the loops.

Figure 16:
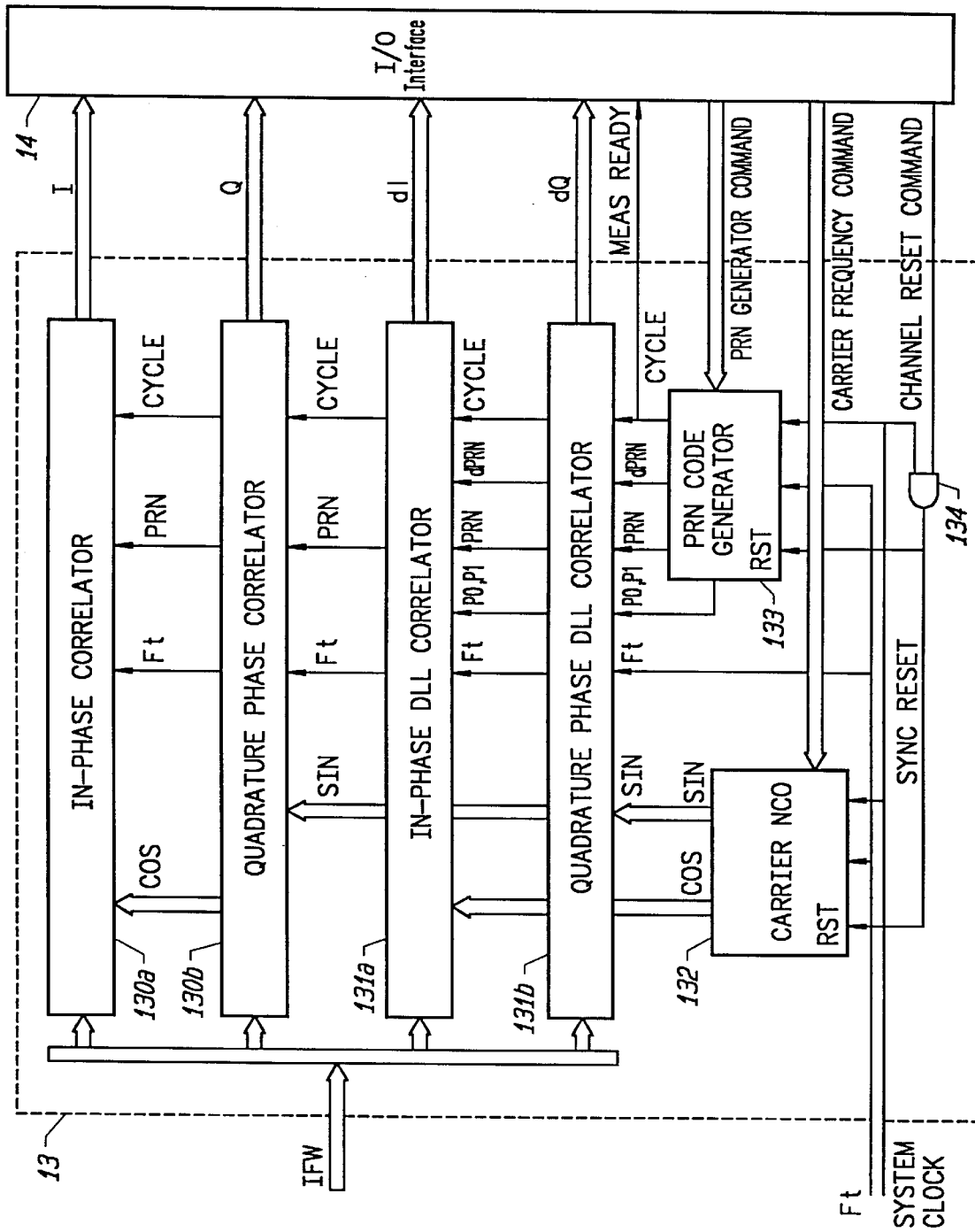
FIG. 16 is a block diagram of one channel of the receiver of FIG. 14.

Going briefly back to FIG. 16, the delay lock loop will be described in more detail. The DLL has 2 configurations, acquisition mode or tracking mode, depending on the channel locking phase. As described in the prior section, the tracking mode preferably uses an "edge DLL" correlator, while the acquisition mode uses a 0.1 chip delay DLL. The selection between 2 modes is made through the signal DLL SELECT. Other specific combinations of tracking and acquisition mode correlators may also be employed.

The delay lock loop (DLL) processing is timed at a Ft rate similarly to the PLL, and the measurement update rate is CYCLE as well. The DLL uses dI and dQ information coming from an in-phase DLL correlator 131a for dI, and a quadrature phase DLL correlator 131b for dQ. The DLL drives the dQ value to zero when in tracking mode. The dQ is used in conjunction with dI when in acquisition mode. The processed information is used to control the PRN GENERATOR COMMANDS of the PRN Code Generator 133.

The "edge DLL" principle, previously described with respect to FIGS. 10, 11D and 12, will be described in more detail, in light of the GPS receiver just described. For "edge DLL" implementation purposes, four time intervals of equal duration have to be defined around the PRN code transition; two before the code transition and two after. In the current embodiment, each time interval has an exact duration of 1/Fs or the IF sampling period.

We thus infer that every time interval contains one and only one IF sample at a Fs rate. The relative position of the samples in the interval is unknown and depends on the relative phase between code generator and sampling clock. The full formula expressing the DLL response is given below.

Assume that $S_{-2}$, $S_{-1}$, $S_{+1}$, $S_{+2}$ is a sequence of four consecutive IF samples with the code transition between $S_{-1}$ and $S_{+1}$, and the associated sampled PRN code sequence is $PRN_{-2}$, $PRN_{-1}$, $PRN_{+1}$, $PRN_{+2}$ (with $PRN_{-2}=PRN_{-1}$ and $PRN_{+1}=PRN_{+2}$). dPRN may be defined as:

$$dPRN = \tfrac{1}{2} \cdot (PRN_{+1} - PRN_{-1})$$

Thus dPRN equals:
- +1, if the transition is a rising edge,
- −1, if the transition is a falling edge,
- 0, if two consecutive PRN chips are identical. dPRN can be thought as the derivative of the PRN sequence.

At every PRN chip code transition, the elementary DLL contribution is given by:

$$DLL_i = (-S_{-2} + S_{-1} + S_{+1} - S_{+2}) \oplus dPRN$$

The contribution is not zero if $dPRN \neq 0$ (i.e. if $PRN_{-1} \neq PRN_{+1}$).

After an integration period defined between two contiguous CYCLE transitions, the full DLL response will be:

$$DLL = \sum_i DLLi$$

This summation performs a low pass frequency filtering function of the measurements dI and dQ.

Going back to the physical implementation, we notice that knowing a code transition falls inside a group of 4 IFW samples, we still have to know between which samples of the group the code transition falls. The signals P0 and P1 show where the code transition falls among the 4 IFW samples. Because we need to add 4 consecutive values and the code transition can have 4 different positions in the sequence, we need to keep the 3 previous samples of the previous sequence of 4 IFW. The total sequence will be, from the oldest sample to the newest: $S_{2A}$, $S_{3A}$, $S_{4A}$, $S_1$, $S_2$, $S_3$, $S_4$ and $PRN_4$ being the PRN code synchronous with $S_4$.

TABLE 1

| P1 value | P0 value | code transition falls between | Elementay DLL operation in tracking mode | Elementay DLL operation in acquisition mode |
|---|---|---|---|---|
| 0 | 0 | $S_{3A}$ and $S_{4A}$ | $(-S_{2A} + S_{3A} + S_{4A} - S_1) \oplus dPRN$ | $(+S_{2A} + S_{3A} + S_{4A} + S_1) \oplus dPRN$ |
| 0 | 1 | $S_{4A}$ and $S_1$ | $(-S_{3A} + S_{4A} + S_1 - S_2) \oplus dPRN$ | $(+S_{3A} + S_{4A} + S_1 + S_2) \oplus dPRN$ |
| 1 | 0 | $S_1$ and $S_2$ | $(-S_{4A} + S_1 + S_2 - S_3) \oplus dPRN$ | $(+S_{4A} + S_1 + S_2 + S_3) \oplus dPRN$ |
| 1 | 1 | $S_2$ and $S_3$ | $(-S_1 + S_2 + S_3 - S_4) \oplus dPRN$ | $(S_1 + S_2 + S_3 + S_4) \oplus dPRN$ |

Figure 20:
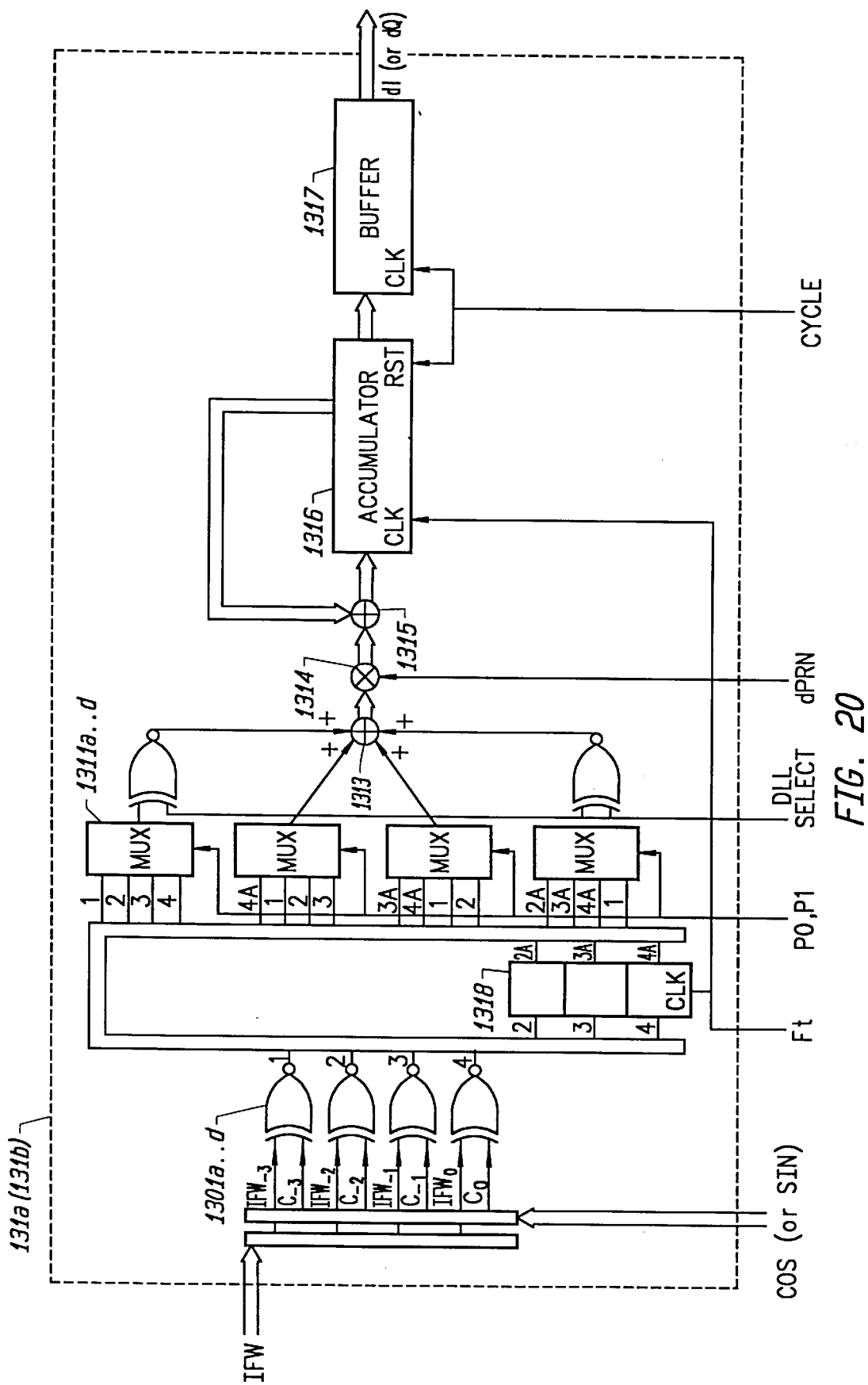
FIG. 20 is a block diagram of the DLL correlator (in-phase and quadrature phase) used in the channel circuit of FIG. 16.

Going to FIG. 20, the implementation of the In-Phase DLL correlator 131*a* is described in detail. After multiplying IFW by the Carrier word COS by 1310*a* to 1310*d*, the three last samples of the current IFW word are latched in 1318. At the input of the four multiplexors 1311*a* to 1311*d*, seven samples are simultaneously available, $S_1$ to $S_4$ from the current IFW and $S_{2A}$ to $S_{4A}$ from the preceding one. Depending on the current value of P1 and P0, a common selection is made on all 4 multiplexors. For the remaining of the explanation, we will assume that P0=P1=0. On 1311*a* output, $S_1$ is available; on 1311*b*, $S_{4A}$ is available, and so on. The adder 1313 adds up all selected samples (interpreting "0" inputs as "−1" value in the process). The result is then multiplied by dPRN to form the elementary value $DLL_1$. In tracking mode, the signal DLL SELECT will invert the values coming out from the first and the last multiplexor, thus fully implementing the tracking DLL formula described in the first line of the Table 1.

The current value between +4 and −4 is algebraically added to the accumulator 1316 by the adder 1315 during the same Ft transition. Every transition on CYCLE transfers the accumulator value to the buffer 1317, resets the accumulator, and finally initiates a new measurement period.

There is only a slight difference when implementing the acquisition mode. The circuitry is identical up to the adder 1313, except that the first and last sample coming out from the multiplexor 1311*a* and 1311*d* are not inverted. The dPRN signal is defined the same way than previously, but its size is expanded to reach 0.1 code chip duration, centered on the code transition.

Figure 18:
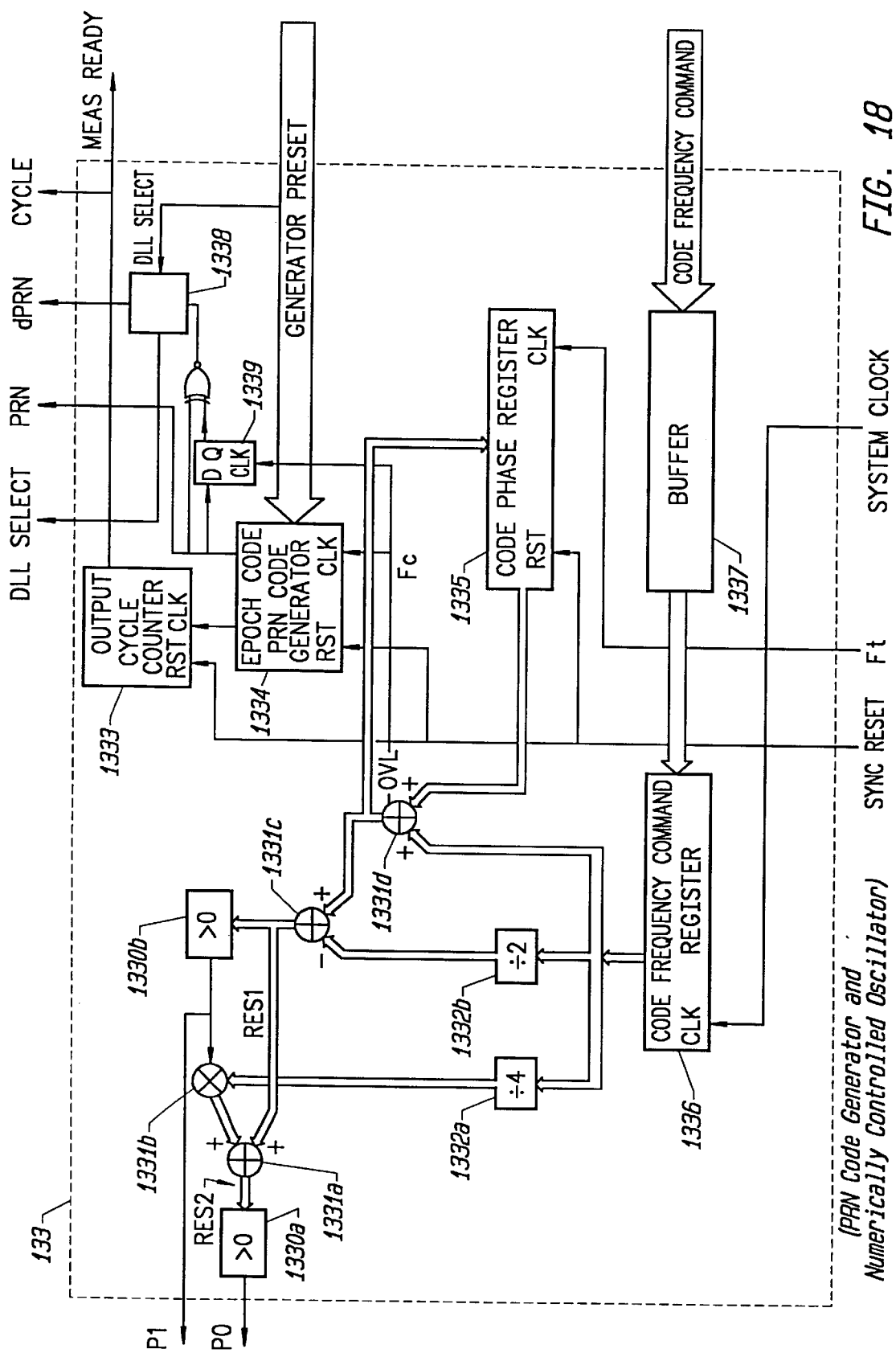
FIG. 18 shows the PRN code generator of the channel of FIG. 16, along with its numerically controlled oscillator.

Referring to FIG. 18, the full PRN code generator will be described. The Generator is in fact composed of a code numerically controlled oscillator (NCO), which delivers a chip frequency clock Fc whose frequency is in direct control of the processor through the CODE FREQUENCY COMMAND; in turn, Fc clocks the PRN code generator 1334 per se.

Let's begin by the Code NCO description: similarly to the carrier NCO, it is embodied by a code phase register 1335, whose full range represents 2Π of the code phase. At every Ft transition, the word into code frequency command register 1336 is added (modulo the range of code phase register) to the contents of the code phase register by the adder 1331*d*. The carry signal coming from the adder is used as chip frequency Fc. The CODE FREQUENCY COMMAND word present in the code frequency command register is loaded at every SYSTEM CLOCK transition from the buffer 1337. The buffer is itself loaded from the processor at any time. Another important function of the code NCO is to deliver the signals P0 and P1, whose function was described earlier.

The P0 and P1 signals are generated as follows: if R is the total range of the code phase register (CPR) 1335, and $\Delta\phi$ is the phase increment at every FS sample ($\Delta\phi$=CODE FREQUENCY COMMAND /4).

P1 is obtained by subtracting the Code Frequency Register (CFR) 1336 divided by two (by divider 1332*b*) from the Code Phase Register (CPR) 1335 by use of the adder 1331*c*. If the result RES1 is positive, P1=1.

The P0 case is different depending on the P1 value. If P1 is zero (CPR <2Δφ), CFR, divided by four (by divider 1332*a*), is multiplied by −1 in the multiplier 1331*b*; if P1 is one (CPR≧2Δφ), CFR/4 is multiplied by +1. Then 1331*a* adds RES1 to the multiplication result; the carry of the adder 1331*a* is taken as P0. The final result is in agreement with Table 2.

The PRN code generator 1334 is clocked by the chip frequency Fc. It is configured for a particular satellite sequence by the command GENERATOR PRESET. It outputs an epoch signal, synchronous with a particular instant in the PRN sequence, which is taken as reference in the PRN ranging sequence. The data bits superimposed on the PRN sequence have their transition perfectly synchronous with this epoch signal.

The EPOCH signal clocks the cycle counter 1333, which is reset at the initialization of the channel by the SYNC RESET, and counts an integer number of epochs (preset at the preset sequence) before to generate a transition on CYCLE, which stops the current measurement cycle on all correlators and informs the processor by the signal MEAS READY. Every channel has its own cycle counter, synchronized on its own data transitions. After a synchronizing phase on the data transitions, it is possible to slow down the measurement periods up to 20 ms, no data transitions occurring during this period.

It is assumed, accurately, that the edge DLL correlator used on C/A code, with a precorrelation bandwidth prefiltering (typically 20.46 Mhz double sided) improves the multipath error. A PRN code transition detector is built X-ORing the current code output and the previous one latched in the latch 1339. The signal dPRN is generated by 1338 according to the description in the DLL principle explanation.

According to the usual multipath model, the direct received signal is given by:

$$A \cdot PRN(t) \cdot \cos(\omega_0 t + \phi)$$

where:

A is the amplitude of the received signal

PRN(t) is the pseudo-random sequence $\omega_0$ is the carrier frequency pulsation $\phi$ is the carrier phase offset The multipath signal is given by:

$$A \cdot \alpha \cdot PRN(t-\tau) \cdot \cos(\omega_0(t-\tau) + \phi - \theta)$$

where:

$\alpha$ is the amplitude ratio between direct and multipath signal $\tau$ is the propagation delay between direct and multipath signal $\theta$ is the additional phase rotation between direct and multipath signal.

TABLE 2

| | 0 < CPR ≦ Δφ | Δφ < CPR ≦ 2Δφ | 2Δφ < CPR ≦ R − 2Δφ | R − 2Δφ < CPR ≦ R − Δφ | R − Δφ < CPR ≦ R |
|---|---|---|---|---|---|
| P1 | 0 | 0 | 1 | 1 | 1 |
| P0 | 1 | 0 | 0 | 1 | 0 |

The main effect of the presence of a multipath signal is to shift the zero crossing of the DLL response from the "zero multipath" reference differently for each of the three discriminators. The DLL driving the DLL correlator output to zero in average, the difference between zero crossings will be seen directly as an error in the measured code phase. As the different satellites on which the channels do not experience the same multipaths because of a different geometry, the position computation will be erroneous.

Returning to the above description, with respect to FIGS. 11D and 12, of operation of a receiver that uses the demodulation technique of FIG. 10, a few alternate local gating sequences will be described. FIGS. 21B, 21C and 21D give other examples of what the gating signal generator 343 can provide in line 341. The result in terms of the error signal characteristic of FIG. 9D is substantially the same, but the different gating sequences of FIGS. 21B–D cause the height and duration of the non-zero portions of the FIG. 9D curve to change somewhat. The fundamental advantage is retained, however, of providing extended intervals where the error signal is zero.

In each of FIGS. 21B–D, a carefully controlled gating signal occurs at each of transitions 365, 367, etc., of the incoming code (FIG. 21A). In FIG. 21B, negative portions 369 and 371 of the signal have a magnitude less than 1, while corresponding positive portions 373 and 375 have a magnitude of 1. The lower magnitude negative portions of the signal are given longer durations, however, so that the areas of the pulse portions 369 and 373 are equal, as are the areas 371 and 375. In the gating signal of FIG. 21C, a positive area 377 (magnitude less than 1) is much smaller than a negative area 379 (magnitude more than 1), while a positive area 381 is much smaller than a negative going area 383. This gating signal differs from the others shown herein by aligning with the code signal edge 365 (when a minimum error condition exists) a transition between negative and positive going portions of the signal. Each of the signals of FIGS. 11D, 12, 21B and 21C is symmetrical about the code edge. The signals are positioned with their middle aligned with the code edge.

In FIG. 21D, however, the gating signal is non-symmetrical about the incoming code edge. But the positive and negative going pulse portions have equal areas on each side of the code edge. That is, areas 385 and 387, on one side of the code edge 365, are substantially equal, while the areas 389 and 391 on the other side of the code edge 365 are also substantially equal.

Although several specific examples of compound gating pulse shapes have been given, there are numerous other shapes, with various relative magnitudes, that can be employed instead. The total negative and positive going areas of any such compound gating pulse is made to be substantially equal. This property causes the multipath signal to be substantially eliminated so long as its delay from the line of sight signal is sufficient.

Although the various aspects of the present invention have been described with respect to their preferred implementations, it is understood that the invention is protected within the full scope of the appended claims.

It is claimed:

1. A method of reducing errors in a received signal, comprising:
    locking one or more delay locked loop correlators onto a combination of line-of-sight and multipath signals;
    providing a loop gain in the central region of said combination of line-of-sight and multipath signals, whereby said correlators discriminate against said multipath signals by producing a plurality of zero segments separated by operating segments in an error signal wherein only line-of-sight or multipath signals of said combination that have a relative phase within said operating segments affect said locking, if a receiver is not in a start-up mode; and
    providing a loop gain in the central region of said combination of line-of-sight and multipath signals, whereby said correlators do not discriminate against said multipath signals by producing a plurality of zero segments separated by operating segments in an error signal wherein only line-of-sight or multipath signals of said combination that have a relative phase within said operating segments affect said locking, if a receiver is in said start-up mode.

2. A computer program product comprising:
    a computer usable medium having computer readable program code embodied therein configured to reduce errors in a received signal, said computer program product comprising:
    computer readable code configured to cause a computer to lock one or more delay locked loop correlators onto a combination of line-of-sight and multipath signals;
    computer readable code configured to cause a computer to provide a loop gain in the central region of said combination of line-of-sight and multipath signals, whereby said correlators discriminate against said multipath signals by producing a plurality of zero segments separated by operating segments in an error signal wherein only line-of-sight or multipath signals of said combination that have a relative phase within said operating segments affect said locking, if a receiver is not in a start-up mode; and
    computer readable code configured to cause a computer to provide a loop gain in the central region of said combination of line-of-sight and multipath signals, whereby said correlators do not discriminate against said multipath signals by producing a plurality of zero segments separated by operating segments in an error signal wherein only line-of-sight or multipath signals of said combination that have a relative phase within said operating segments affect said locking, if a receiver is in said start-up mode.

3. A receiver configured to reduce errors in a received signal, comprising:
    one or more delay locked loop correlators, said correlators configured to lock onto a combination of line-of-sight and multipath signals; and
    signal processors providing a loop gain in the central region of said combination of line-of-sight and multipath signals so that said correlators discriminate against said multipath signals by producing a plurality of zero segments separated by operating segments in an error signal wherein only line-of-sight or multipath signals of said combination that have a relative phase within said operating segments affect said locking, if a receiver is not in a start-up mode;
    said signal processors also providing a loop gain in the central region of said combination of line-of-sight and multipath signals, whereby said correlators do not discriminate against said multipath signals by producing a plurality of zero segments separated by operating segments in an error signal wherein only line-of-sight or multipath signals of said combination that have a relative phase within said operating segments affect said locking, if a receiver is in said start-up mode.

4. A system for reducing errors in a received signal, comprising:

one or more delay locked loop correlators, said correlators configured to lock onto a combination of line-of-sight and multipath signals;

signal processors providing a loop gain in the central region of said combination of line-of-sight and multipath signals so that said correlators discriminate against said multipath signals by producing a plurality of zero segments separated by operating segments in an error signal wherein only line-of-sight or multipath signals of said combination that have a relative phase within said operating segments affect said locking, if a receiver is not in a start-up mode;

said signal processors also providing a loop gain in the central region of said combination of line-of-sight and multipath signals, whereby said correlators do not discriminate against said multipath signals by producing a plurality of zero segments separated by operating segments in an error signal wherein only line-of-sight or multipath signals of said combination that have a relative phase within said operating segments affect said locking, if a receiver is in said start-up mode.

* * * * *